United States Patent
Khetawat et al.

(10) Patent No.: US 8,019,331 B2
(45) Date of Patent: Sep. 13, 2011

(54) FEMTOCELL INTEGRATION INTO THE MACRO NETWORK

(75) Inventors: Amit Khetawat, San Jose, CA (US); Patrick Tao, San Jose, CA (US); Milan Markovic, Pleasanton, CA (US); Rajeev Gupta, Sunnyvale, CA (US); Michael D. Gallagher, San Jose, CA (US)

(73) Assignee: Kineto Wireless, Inc., Milpitas, CA (US)

( * ) Notice: Subject to any disclaimer, the term of this patent is extended or adjusted under 35 U.S.C. 154(b) by 671 days.

(21) Appl. No.: 12/027,255

(22) Filed: Feb. 6, 2008

(65) Prior Publication Data

US 2008/0207170 A1 Aug. 28, 2008

Related U.S. Application Data

(60) Provisional application No. 60/891,583, filed on Feb. 26, 2007, provisional application No. 60/892,800, filed on Mar. 2, 2007, provisional application No. 60/949,826, filed on Jul. 13, 2007, provisional application No. 60/956,669, filed on Aug. 17, 2007.

(51) Int. Cl.
*H04Q 7/20* (2006.01)

(52) U.S. Cl. ............ 455/422.1; 455/436; 455/458; 455/445; 455/456.1; 455/435.1; 370/395.2

(58) Field of Classification Search ............ 455/414.1, 455/436, 456.1
See application file for complete search history.

(56) References Cited

U.S. PATENT DOCUMENTS

| | | | |
|---|---|---|---|
| 5,014,197 A | 5/1991 | Wolf | |
| 5,101,501 A | 3/1992 | Gilhousen et al. | |
| 5,109,528 A | 4/1992 | Uddenfeldt | |
| 5,226,045 A | 7/1993 | Chuang | |
| 5,235,632 A | 8/1993 | Raith | |
| 5,260,944 A | 11/1993 | Tomabechi | |
| 5,260,988 A | 11/1993 | Schellinger et al. | |
| 5,267,261 A | 11/1993 | Blakeney, II et al. | |

(Continued)

FOREIGN PATENT DOCUMENTS

CN 1909726 A 7/2007

(Continued)

OTHER PUBLICATIONS

Updated portions of prosecution history of U.S. Appl. No. 11/013,883, Nov. 6, 2009, Gallagher, Michael, et al.

(Continued)

*Primary Examiner* — Charles Shedrick
(74) *Attorney, Agent, or Firm* — Adeli & Tollen LLP

(57) ABSTRACT

Some embodiments of the invention provide a communication system that includes a first communication network, a second communication network, and a core network. The second communication network includes a network controller and a group of two or more access areas that are communicatively coupled to the core network by the network controller. Some embodiments service the second network access areas by providing access area identifiers to each access area while communicating with the first network or core network using a single are identifier assigned to the network controller. Some embodiments provide access control by sending a series of invalid messages to a user equipment (UE) that is not authorized to access services of the second network to reject the UE. Some embodiments reject the UE by sending a message to ban a UE from an access area with a particular access area identifier.

25 Claims, 16 Drawing Sheets

U.S. PATENT DOCUMENTS

| | | |
|---|---|---|
| 5,367,558 A | 11/1994 | Gillig et al. |
| 5,390,233 A | 2/1995 | Jensen et al. |
| 5,392,331 A | 2/1995 | Patsiokas et al. |
| 5,406,615 A | 4/1995 | Miller, II et al. |
| 5,428,601 A | 6/1995 | Owen |
| 5,442,680 A | 8/1995 | Schellinger et al. |
| 5,448,619 A | 9/1995 | Evans et al. |
| 5,507,035 A | 4/1996 | Bantz et al. |
| 5,533,027 A | 7/1996 | Akerberg et al. |
| 5,594,782 A | 1/1997 | Zicker et al. |
| 5,610,969 A | 3/1997 | McHenry et al. |
| 5,634,193 A | 5/1997 | Ghisler |
| 5,640,414 A | 6/1997 | Blakeney, II et al. |
| 5,659,598 A | 8/1997 | Byrne et al. |
| 5,659,878 A | 8/1997 | Uchida et al. |
| 5,664,005 A | 9/1997 | Emery et al. |
| 5,673,307 A | 9/1997 | Holland et al. |
| 5,675,629 A | 10/1997 | Raffel et al. |
| 5,724,658 A | 3/1998 | Hasan |
| 5,732,076 A | 3/1998 | Ketseoglou et al. |
| 5,745,852 A | 4/1998 | Khan et al. |
| 5,758,281 A | 5/1998 | Emery et al. |
| 5,796,727 A | 8/1998 | Harrison et al. |
| 5,796,729 A | 8/1998 | Greaney et al. |
| 5,815,525 A | 9/1998 | Smith et al. |
| 5,818,820 A | 10/1998 | Anderson et al. |
| 5,822,681 A | 10/1998 | Chang et al. |
| 5,822,767 A | 10/1998 | MacWilliams et al. |
| 5,825,759 A | 10/1998 | Liu |
| 5,852,767 A | 12/1998 | Sugita |
| 5,862,345 A | 1/1999 | Okanoue et al. |
| 5,870,677 A | 2/1999 | Takahashi et al. |
| 5,887,020 A | 3/1999 | Smith et al. |
| 5,887,260 A | 3/1999 | Nakata |
| 5,890,055 A | 3/1999 | Chu et al. |
| 5,890,064 A | 3/1999 | Widergen et al. |
| 5,903,834 A | 5/1999 | Wallstedt et al. |
| 5,915,224 A | 6/1999 | Jonsson |
| 5,924,027 A * | 7/1999 | Valentine et al. ............. 455/417 |
| 5,926,760 A | 7/1999 | Khan et al. |
| 5,936,949 A | 8/1999 | Pasternak et al. |
| 5,940,512 A | 8/1999 | Tomoike |
| 5,946,622 A | 8/1999 | Bojeryd |
| 5,949,773 A | 9/1999 | Bhalla et al. |
| 5,960,341 A | 9/1999 | LeBlanc et al. |
| 5,995,828 A | 11/1999 | Nishida |
| 6,016,318 A | 1/2000 | Tomoike |
| 6,035,193 A | 3/2000 | Buhrmann et al. |
| 6,052,592 A | 4/2000 | Schellinger et al. |
| 6,101,176 A | 8/2000 | Honkasalo et al. |
| 6,112,080 A | 8/2000 | Anderson et al. |
| 6,112,088 A | 8/2000 | Haartsen |
| 6,119,000 A | 9/2000 | Stephenson et al. |
| 6,130,886 A | 10/2000 | Ketseoglou et al. |
| 6,134,227 A | 10/2000 | Magana |
| 6,138,019 A | 10/2000 | Trompower et al. |
| 6,167,279 A | 12/2000 | Chang et al. |
| 6,198,941 B1 | 3/2001 | Aho et al. |
| 6,226,515 B1 | 5/2001 | Pauli et al. |
| 6,236,852 B1 | 5/2001 | Veerasamy et al. |
| 6,243,581 B1 | 6/2001 | Jawanda |
| 6,256,511 B1 | 7/2001 | Brown et al. |
| 6,263,211 B1 | 7/2001 | Brunner et al. |
| 6,269,086 B1 | 7/2001 | Magana et al. |
| 6,320,873 B1 | 11/2001 | Nevo et al. |
| 6,327,470 B1 | 12/2001 | Ostling |
| 6,359,872 B1 | 3/2002 | Mahany et al. |
| 6,374,102 B1 | 4/2002 | Brachman et al. |
| 6,381,457 B1 | 4/2002 | Carlsson et al. |
| 6,389,059 B1 | 5/2002 | Smith et al. |
| 6,393,007 B1 | 5/2002 | Haartsen |
| 6,415,158 B1 | 7/2002 | King et al. |
| 6,430,395 B2 | 8/2002 | Arazi et al. |
| 6,434,389 B1 | 8/2002 | Meskanen et al. |
| 6,445,921 B1 | 9/2002 | Bell |
| 6,463,307 B1 | 10/2002 | Larsson et al. |
| 6,493,629 B1 | 12/2002 | Van Bosch |
| 6,529,491 B1 | 3/2003 | Chang et al. |
| 6,539,237 B1 | 3/2003 | Sayers et al. |
| 6,542,516 B1 | 4/2003 | Vialen et al. |
| 6,553,219 B1 | 4/2003 | Vilander et al. |
| 6,556,822 B1 | 4/2003 | Matsumoto |
| 6,556,825 B1 | 4/2003 | Mansfield |
| 6,556,830 B1 | 4/2003 | Lenzo |
| 6,574,266 B1 | 6/2003 | Haartsen |
| 6,587,444 B1 | 7/2003 | Lenzo et al. |
| 6,633,761 B1 | 10/2003 | Singhal et al. |
| 6,643,512 B1 | 11/2003 | Ramaswamy |
| 6,647,426 B2 | 11/2003 | Mohammed |
| 6,658,250 B1 | 12/2003 | Ganesan et al. |
| 6,665,276 B1 | 12/2003 | Culbertson et al. |
| 6,671,506 B1 | 12/2003 | Lee |
| 6,675,009 B1 | 1/2004 | Cook |
| 6,680,923 B1 | 1/2004 | Leon |
| 6,708,033 B1 | 3/2004 | Linkola et al. |
| 6,711,400 B1 | 3/2004 | Aura |
| 6,766,160 B1 | 7/2004 | Lemilainen et al. |
| 6,785,535 B2 | 8/2004 | Lucidarme et al. |
| 6,788,656 B1 | 9/2004 | Smolentzov et al. |
| 6,801,519 B1 | 10/2004 | Mangel |
| 6,801,772 B1 | 10/2004 | Townend et al. |
| 6,801,777 B2 | 10/2004 | Rusch |
| 6,807,417 B2 | 10/2004 | Sallinen et al. |
| 6,823,154 B2 | 11/2004 | Koga et al. |
| 6,824,048 B1 | 11/2004 | Itabashi et al. |
| 6,826,154 B2 | 11/2004 | Subbiah et al. |
| 6,829,227 B1 | 12/2004 | Pitt |
| 6,842,462 B1 | 1/2005 | Ramjee et al. |
| 6,842,621 B2 | 1/2005 | Labun et al. |
| 6,845,095 B2 | 1/2005 | Krishnarajah et al. |
| 6,850,503 B2 | 2/2005 | Dorenbosch et al. |
| 6,853,851 B1 | 2/2005 | Rautiola et al. |
| 6,888,811 B2 | 5/2005 | Eaton et al. |
| 6,895,255 B1 | 5/2005 | Bridgelall |
| 6,909,705 B1 | 6/2005 | Lee et al. |
| 6,922,559 B2 | 7/2005 | Mohammed |
| 6,925,074 B1 | 8/2005 | Vikberg et al. |
| 6,937,862 B2 | 8/2005 | Back et al. |
| 6,970,719 B1 | 11/2005 | McConnell et al. |
| 6,993,359 B1 | 1/2006 | Nelakanti et al. |
| 7,009,952 B1 | 3/2006 | Razavilar et al. |
| 7,028,186 B1 | 4/2006 | Stenman et al. |
| 7,039,025 B1 | 5/2006 | Menon et al. |
| 7,039,027 B2 | 5/2006 | Bridgelall |
| 7,054,627 B1 | 5/2006 | Hillman |
| 7,065,353 B1 | 6/2006 | Bolinth et al. |
| 7,069,022 B2 * | 6/2006 | Rajaniemi et al. ......... 455/456.1 |
| 7,099,339 B1 | 8/2006 | Wang et al. |
| 7,107,055 B2 | 9/2006 | Gallagher et al. |
| 7,127,250 B2 | 10/2006 | Gallagher et al. |
| 7,171,199 B1 | 1/2007 | Rahman |
| 7,171,205 B2 | 1/2007 | Gallagher et al. |
| 7,171,215 B2 | 1/2007 | Khouaja et al. |
| 7,197,309 B2 | 3/2007 | Gallagher et al. |
| 7,200,112 B2 | 4/2007 | Sundar et al. |
| 7,200,383 B2 | 4/2007 | Eronen |
| 7,200,399 B2 | 4/2007 | Gallagher et al. |
| 7,209,744 B2 | 4/2007 | Gallagher et al. |
| 7,212,819 B2 | 5/2007 | Gallagher et al. |
| 7,215,961 B2 | 5/2007 | Gallagher et al. |
| 7,245,916 B2 | 7/2007 | Gallagher et al. |
| 7,251,227 B2 | 7/2007 | de Jong et al. |
| 7,272,397 B2 | 9/2007 | Gallagher et al. |
| 7,283,821 B2 | 10/2007 | Gallagher et al. |
| 7,283,822 B2 | 10/2007 | Gallagher et al. |
| 7,307,963 B2 | 12/2007 | Chow et al. |
| 7,308,263 B2 | 12/2007 | Gallagher et al. |
| 7,324,818 B2 | 1/2008 | Gallagher et al. |
| 7,349,698 B2 | 3/2008 | Gallagher et al. |
| 7,356,145 B2 | 4/2008 | Ala-Laurila et al. |
| 7,369,854 B2 | 5/2008 | Gallagher et al. |
| 7,369,859 B2 | 5/2008 | Gallagher |
| 7,454,207 B2 | 11/2008 | Gallagher et al. |
| 7,471,655 B2 | 12/2008 | Gallagher et al. |
| 7,515,575 B1 | 4/2009 | Shi et al. |
| 7,558,584 B2 | 7/2009 | Yamamoto et al. |
| 7,640,008 B2 | 12/2009 | Gallagher et al. |

| Pub. No. | Date | Inventor |
|---|---|---|
| 2001/0029186 A1 | 10/2001 | Canyon et al. |
| 2001/0031645 A1 | 10/2001 | Jarrett |
| 2001/0046214 A1 | 11/2001 | Kang |
| 2001/0046860 A1 | 11/2001 | Lee |
| 2001/0049790 A1 | 12/2001 | Faccin et al. |
| 2002/0032030 A1 | 3/2002 | Berglund et al. |
| 2002/0045459 A1 | 4/2002 | Morikawa |
| 2002/0051431 A1 | 5/2002 | Choi et al. |
| 2002/0059516 A1 | 5/2002 | Turtiainen et al. |
| 2002/0065099 A1 | 5/2002 | Bjorndahl |
| 2002/0066036 A1 | 5/2002 | Makineni et al. |
| 2002/0075844 A1 | 6/2002 | Hagen |
| 2002/0080797 A1 | 6/2002 | Kim |
| 2002/0082015 A1 | 6/2002 | Wu |
| 2002/0085516 A1 | 7/2002 | Bridgelall |
| 2002/0101848 A1 | 8/2002 | Lee et al. |
| 2002/0102974 A1 | 8/2002 | Raith |
| 2002/0118674 A1 | 8/2002 | Faccin et al. |
| 2002/0119766 A1* | 8/2002 | Bianconi et al. .............. 455/406 |
| 2002/0123325 A1 | 9/2002 | Cooper |
| 2002/0131387 A1 | 9/2002 | Pitcher et al. |
| 2002/0132630 A1 | 9/2002 | Arazi et al. |
| 2002/0142761 A1 | 10/2002 | Wallstedt et al. |
| 2002/0147008 A1 | 10/2002 | Kallio |
| 2002/0147016 A1 | 10/2002 | Arazi et al. |
| 2002/0150091 A1 | 10/2002 | Lopponen et al. |
| 2002/0155829 A1 | 10/2002 | Proctor, Jr. et al. |
| 2002/0156646 A1 | 10/2002 | Kaiwa et al. |
| 2002/0160811 A1 | 10/2002 | Jannette et al. |
| 2002/0161905 A1 | 10/2002 | Haverinen et al. |
| 2002/0164984 A1 | 11/2002 | Thakker |
| 2002/0166068 A1 | 11/2002 | Kilgore |
| 2002/0174335 A1 | 11/2002 | Zhang et al. |
| 2002/0187780 A1 | 12/2002 | Souissi |
| 2002/0187793 A1* | 12/2002 | Papadimitriou et al. ....... 455/458 |
| 2002/0191556 A1 | 12/2002 | Krishnarajah et al. |
| 2002/0191575 A1 | 12/2002 | Kalavade et al. |
| 2002/0197984 A1 | 12/2002 | Monin et al. |
| 2003/0007475 A1 | 1/2003 | Tsuda et al. |
| 2003/0013458 A1 | 1/2003 | Yabe et al. |
| 2003/0026269 A1 | 2/2003 | Paryani |
| 2003/0031151 A1 | 2/2003 | Sharma et al. |
| 2003/0043773 A1 | 3/2003 | Chang |
| 2003/0058816 A1 | 3/2003 | Shearer, III |
| 2003/0087653 A1 | 5/2003 | Leung et al. |
| 2003/0101356 A1 | 5/2003 | Miettinen et al. |
| 2003/0112789 A1 | 6/2003 | Heinonen et al. |
| 2003/0119480 A1 | 6/2003 | Mohammed |
| 2003/0119490 A1 | 6/2003 | Mohammed |
| 2003/0119527 A1 | 6/2003 | Labun et al. |
| 2003/0119548 A1 | 6/2003 | Mohammed |
| 2003/0130008 A1 | 7/2003 | Rajaniemi et al. |
| 2003/0139180 A1 | 7/2003 | McIntosh et al. |
| 2003/0142673 A1 | 7/2003 | Patil et al. |
| 2003/0157922 A1 | 8/2003 | Akhteruzzaman et al. |
| 2003/0172264 A1 | 9/2003 | Dillon |
| 2003/0176186 A1 | 9/2003 | Mohammed |
| 2003/0193952 A1 | 10/2003 | O'Neill |
| 2003/0210199 A1 | 11/2003 | Sward et al. |
| 2003/0217132 A1 | 11/2003 | Batten et al. |
| 2003/0219022 A1 | 11/2003 | Dillon et al. |
| 2003/0219024 A1 | 11/2003 | Purnadi et al. |
| 2003/0224820 A1 | 12/2003 | Einola et al. |
| 2003/0235186 A1 | 12/2003 | Park |
| 2004/0008649 A1 | 1/2004 | Wybenga et al. |
| 2004/0009749 A1 | 1/2004 | Arazi et al. |
| 2004/0013099 A1 | 1/2004 | O'Neill |
| 2004/0025018 A1 | 2/2004 | Haas et al. |
| 2004/0037312 A1 | 2/2004 | Spear |
| 2004/0038664 A1 | 2/2004 | Stoks |
| 2004/0053623 A1 | 3/2004 | Hoff et al. |
| 2004/0063451 A1 | 4/2004 | Bonta et al. |
| 2004/0068571 A1 | 4/2004 | Ahmavaara |
| 2004/0072593 A1 | 4/2004 | Robbins et al. |
| 2004/0077335 A1 | 4/2004 | Lee et al. |
| 2004/0077355 A1 | 4/2004 | Krenik et al. |
| 2004/0077356 A1 | 4/2004 | Krenik et al. |
| 2004/0077374 A1 | 4/2004 | Terry |
| 2004/0087307 A1 | 5/2004 | Ibe et al. |
| 2004/0147223 A1 | 7/2004 | Cho |
| 2004/0162105 A1 | 8/2004 | Reddy et al. |
| 2004/0171378 A1 | 9/2004 | Rautila |
| 2004/0202132 A1 | 10/2004 | Heinonen et al. |
| 2004/0203346 A1 | 10/2004 | Myhre et al. |
| 2004/0203737 A1 | 10/2004 | Myhre et al. |
| 2004/0203800 A1 | 10/2004 | Myhre et al. |
| 2004/0203815 A1 | 10/2004 | Shoemake et al. |
| 2004/0218563 A1 | 11/2004 | Porter et al. |
| 2004/0219948 A1 | 11/2004 | Jones et al. |
| 2004/0240525 A1 | 12/2004 | Karabinis et al. |
| 2004/0259541 A1 | 12/2004 | Hicks, III et al. |
| 2004/0264410 A1 | 12/2004 | Sagi et al. |
| 2005/0020280 A1 | 1/2005 | Holland et al. |
| 2005/0041787 A1 | 2/2005 | Casey et al. |
| 2005/0053070 A1 | 3/2005 | Jouppi |
| 2005/0064896 A1 | 3/2005 | Rautiola et al. |
| 2005/0070283 A1 | 3/2005 | Hashimoto et al. |
| 2005/0101245 A1 | 5/2005 | Ahmavaara |
| 2005/0101329 A1 | 5/2005 | Gallagher |
| 2005/0111409 A1 | 5/2005 | Spear et al. |
| 2005/0130654 A1 | 6/2005 | Di Claudio et al. |
| 2005/0130659 A1* | 6/2005 | Grech et al. .................. 455/436 |
| 2005/0144647 A1 | 6/2005 | Zussman et al. |
| 2005/0184145 A1 | 8/2005 | Law et al. |
| 2005/0186948 A1* | 8/2005 | Gallagher et al. ......... 455/414.1 |
| 2005/0198199 A1 | 9/2005 | Dowling |
| 2005/0198306 A1 | 9/2005 | Palojarvi et al. |
| 2005/0207395 A1 | 9/2005 | Mohammed |
| 2005/0239441 A1 | 10/2005 | Eronen |
| 2005/0250522 A1 | 11/2005 | Gilbert |
| 2005/0255879 A1 | 11/2005 | Shi et al. |
| 2005/0265279 A1 | 12/2005 | Markovic et al. |
| 2005/0266853 A1 | 12/2005 | Gallagher et al. |
| 2005/0272425 A1 | 12/2005 | Amerga et al. |
| 2005/0272449 A1 | 12/2005 | Gallagher et al. |
| 2006/0009202 A1 | 1/2006 | Gallagher et al. |
| 2006/0019657 A1 | 1/2006 | Gallagher et al. |
| 2006/0019658 A1 | 1/2006 | Gallagher et al. |
| 2006/0019667 A1 | 1/2006 | Hicks, III |
| 2006/0036733 A1 | 2/2006 | Fujimoto et al. |
| 2006/0094431 A1 | 5/2006 | Saifullah et al. |
| 2006/0098598 A1 | 5/2006 | Gallagher et al. |
| 2006/0099935 A1 | 5/2006 | Gallagher et al. |
| 2006/0111113 A1 | 5/2006 | Waris |
| 2006/0114871 A1 | 6/2006 | Buckley et al. |
| 2006/0116125 A1 | 6/2006 | Buckley et al. |
| 2006/0146803 A1 | 7/2006 | Bae et al. |
| 2006/0153110 A1 | 7/2006 | Morgan et al. |
| 2006/0183482 A1 | 8/2006 | Ueda |
| 2006/0223532 A1 | 10/2006 | Liu et al. |
| 2006/0239277 A1 | 10/2006 | Gallagher et al. |
| 2006/0268845 A1 | 11/2006 | He et al. |
| 2006/0286981 A1 | 12/2006 | Suumaki et al. |
| 2006/0291455 A1 | 12/2006 | Katz et al. |
| 2007/0004405 A1 | 1/2007 | Buckley et al. |
| 2007/0022469 A1 | 1/2007 | Cooper et al. |
| 2007/0041360 A1 | 2/2007 | Gallagher et al. |
| 2007/0053370 A1 | 3/2007 | Aghvami et al. |
| 2007/0054668 A1 | 3/2007 | Scheinert et al. |
| 2007/0094374 A1 | 4/2007 | Karia et al. |
| 2007/0097983 A1* | 5/2007 | Nylander et al. .......... 370/395.2 |
| 2007/0105527 A1* | 5/2007 | Nylander et al. ............. 455/403 |
| 2007/0105568 A1* | 5/2007 | Nylander et al. ............. 455/458 |
| 2007/0183421 A1 | 8/2007 | Terrell et al. |
| 2007/0183427 A1* | 8/2007 | Nylander et al. .......... 370/395.2 |
| 2007/0230453 A1 | 10/2007 | Giaretta et al. |
| 2007/0238448 A1 | 10/2007 | Gallagher et al. |
| 2007/0243872 A1* | 10/2007 | Gallagher et al. ............ 455/436 |
| 2007/0266244 A1 | 11/2007 | Walker et al. |
| 2007/0268855 A1 | 11/2007 | Grayson et al. |
| 2007/0270152 A1* | 11/2007 | Nylander et al. ............. 455/445 |
| 2007/0286092 A1 | 12/2007 | Famolari et al. |
| 2007/0287459 A1 | 12/2007 | Diachina et al. |
| 2007/0293222 A1 | 12/2007 | Vikberg et al. |
| 2008/0039086 A1 | 2/2008 | Gallagher et al. |
| 2008/0039087 A1 | 2/2008 | Gallagher et al. |
| 2008/0043669 A1 | 2/2008 | Gallagher et al. |
| 2008/0051060 A1 | 2/2008 | Lee et al. |

| | | | |
|---|---|---|---|
| 2008/0076386 | A1 | 3/2008 | Khetawat et al. |
| 2008/0076392 | A1 | 3/2008 | Khetawat et al. |
| 2008/0076393 | A1 | 3/2008 | Khetawat et al. |
| 2008/0076411 | A1 | 3/2008 | Khetawat et al. |
| 2008/0076412 | A1 | 3/2008 | Khetawat et al. |
| 2008/0076419 | A1 | 3/2008 | Khetawat et al. |
| 2008/0076420 | A1 | 3/2008 | Khetawat et al. |
| 2008/0076425 | A1 | 3/2008 | Khetawat et al. |
| 2008/0108319 | A1 | 5/2008 | Gallagher et al. |
| 2008/0117841 | A1 | 5/2008 | Chen |
| 2008/0123596 | A1 | 5/2008 | Gallagher et al. |
| 2008/0125120 | A1 | 5/2008 | Gallagher et al. |
| 2008/0130564 | A1 | 6/2008 | Gallagher et al. |
| 2008/0130568 | A1 | 6/2008 | Gallagher et al. |
| 2008/0132224 | A1 | 6/2008 | Gallagher et al. |
| 2008/0132239 | A1 | 6/2008 | Khetawat et al. |
| 2008/0137612 | A1 | 6/2008 | Gallagher et al. |
| 2008/0165725 | A1 | 7/2008 | Huomo et al. |
| 2008/0181204 | A1 | 7/2008 | Gallagher et al. |
| 2008/0207170 | A1* | 8/2008 | Khetawat et al. ............. 455/411 |
| 2008/0220813 | A1 | 9/2008 | Brown et al. |
| 2008/0261596 | A1 | 10/2008 | Khetawat et al. |
| 2008/0299976 | A1 | 12/2008 | Gallagher et al. |
| 2008/0299977 | A1 | 12/2008 | Gallagher et al. |
| 2008/0305792 | A1 | 12/2008 | Khetawat et al. |
| 2008/0305793 | A1 | 12/2008 | Gallagher et al. |
| 2008/0318571 | A1 | 12/2008 | Vikberg et al. |
| 2009/0054070 | A1 | 2/2009 | Gallagher et al. |
| 2009/0149195 | A1 | 6/2009 | Zhu |
| 2010/0041387 | A1 | 2/2010 | Khetawat et al. |
| 2010/0041402 | A1 | 2/2010 | Gallagher et al. |
| 2010/0041403 | A1 | 2/2010 | Khetawat et al. |
| 2010/0062768 | A1* | 3/2010 | Lindqvist et al. .......... 455/435.1 |

FOREIGN PATENT DOCUMENTS

| | | |
|---|---|---|
| EP | 0936777 | 8/1999 |
| EP | 1207708 | 5/2002 |
| EP | 1207708 B1 | 10/2004 |
| EP | 2060130 | 5/2009 |
| EP | 2115946 | 11/2009 |
| EP | 08730429 | 4/2010 |
| FR | 2832895 | 5/2003 |
| GB | 2282735 | 4/1995 |
| GB | 2428937 | 2/2007 |
| GB | 2428942 | 2/2007 |
| GB | 2430120 | 3/2007 |
| GB | 2430121 | 3/2007 |
| GB | 2430839 | 4/2007 |
| GB | 2432082 | 5/2007 |
| WO | WO 92/04796 | 3/1992 |
| WO | WO 97/24004 | 7/1997 |
| WO | WO 99/48312 | 9/1999 |
| WO | WO 99/48315 | 9/1999 |
| WO | WO 00/28762 | 5/2000 |
| WO | WO 00/51387 | 8/2000 |
| WO | WO 02/45456 | 6/2002 |
| WO | WO 03/039009 A2 | 5/2003 |
| WO | WO 03039009 A3 | 8/2003 |
| WO | WO 03/092312 | 11/2003 |
| WO | WO 2004/002051 A3 | 12/2003 |
| WO | WO 2004/034219 | 4/2004 |
| WO | WO 2004/036770 | 4/2004 |
| WO | WO 2004/039111 | 5/2004 |
| WO | WO 2005/006597 | 1/2005 |
| WO | WO 2005/060292 | 6/2005 |
| WO | WO 2005/099185 | 10/2005 |
| WO | WO 2005/057968 A1 | 11/2005 |
| WO | WO 2005/104590 | 11/2005 |
| WO | WO 2005/107169 | 11/2005 |
| WO | WO 2005/107297 | 11/2005 |
| WO | WO 2005/114918 | 12/2005 |
| WO | WO 2005/114920 | 12/2005 |
| WO | WO 2005/120017 | 12/2005 |
| WO | WO 2006/053102 | 5/2006 |
| WO | WO 2007/015066 | 2/2007 |
| WO | WO 2007/015067 | 2/2007 |
| WO | WO 2007/015068 | 2/2007 |
| WO | WO 2007/015071 | 2/2007 |
| WO | WO 2007/015075 | 2/2007 |
| WO | WO 2008/009016 | 1/2008 |
| WO | WO 2008/036961 | 3/2008 |
| WO | WO 2008/055251 | 5/2008 |
| WO | PCT/US2008/054623 | 8/2008 |
| WO | PCT/US2008/076913 | 9/2008 |
| WO | WO 2008/106360 | 9/2008 |
| WO | WO 2009/021152 | 2/2009 |
| WO | WO 2010/019970 | 2/2010 |

OTHER PUBLICATIONS

Updated portions of prosecution history of U.S. Appl. No. 11/080,714, May 20, 2010, Agrawal, Satish, et al.
Updated portions of prosecution history of U.S. Appl. No. 11/096,800, Oct. 22, 2007, Gallagher, Michael, et al.
Portions of prosecution history of U.S. Appl. No. 11/929,630, Jun. 16, 2010, Gallagher, Michael, et al.
International Preliminary Report on Patentability for PCT/US2004/042456, Jun. 20, 2006 (issuance date), Kineto Wireless, Inc.
International Search Report and Written Opinion for PCT/US2009/054098, Oct. 28, 2009 (mailing date), Kineto Wireless, Inc.
International Preliminary Report on Patentability for PCT/US2008/054623, Aug. 26, 2009 (issuance date), Kineto Wireless, Inc.
Non-Final Office Action of U.S. Appl. No. 10/116,311, Feb. 9, 2006 (mailing date), Mohammed, Jahangir.
Non Final Office Action of U.S. Appl. No. 10/115,767, Dec. 22, 2005 (mailing date), Mohammed, Jahangir.
Non-Final Office Action of U.S. Appl. No. 10/116,023, Apr. 13, 2006 (mailing date), Mohammed, Jahangir.
Non-Final Office Action of U.S. Appl. No. 10/115,835, Jul. 25, 2005 (mailing date), Mohammed, Jahangir.
Final Office Action of U.S. Appl. No. 10/116,186, Feb. 1, 2006 (mailing date), Mohammed, Jahangir.
Non-Final Office Action of U.S. Appl. No. 10/251,901, May 5, 2005 (mailing date), Gallagher, Michael, et al.
Non-Final Office Action of U.S. Appl. No. 10/251,901, Aug. 9, 2006 (mailing date), Gallagher, Michael, et al.
Non-Final Office Action of U.S. Appl. No. 10/688,470, Dec. 15, 2005 (mailing date), Gallagher, Michael, et al.
Notice of Allowance of U.S. Appl. No. 10/688,470, Jul. 19, 2006 (mailing date), Gallagher, Michael, et al.
Non-Final Office Action of U.S. Appl. No. 11/004,439, Sep. 21, 2005 (mailing date), Gallagher, Michael.
Non-Final Office Action of U.S. Appl. No. 11/004,439, Apr. 21, 2006 (mailing date), Gallagher, Michael.
Non-Final Office Action of U.S. Appl. No. 11/013,883, Aug. 24, 2006 (mailing date), Gallagher, Michael, et al.
Final Office Action of U.S. Appl. No. 11/013,883, Mar. 6, 2007 (mailing date), Gallagher, Michael, et al.
Advisory Action of U.S. Appl. No. 11/013,883, Jul. 6, 2007 (mailing date), Gallagher, Michael, et al.
Non-Final Office Action of U.S. Appl. No. 11/013,883, Jan. 24, 2008 (mailing date), Gallagher, Michael, et al.
Final Office Action of U.S. Appl. No. 11/013,883, Oct. 14, 2008 (mailing date), Gallagher, Michael, et al.
Non-Final Office Action of U.S. Appl. No. 11/013,883, Feb. 10, 2009 (mailing date), Gallagher, Michael, et al.
Non published Commonly owned U.S. Appl. No. 11/107,538, filed Apr. 14, 2005, Mattson, Geoffrey, et al.
Non published commonly owned U.S. Appl. No. 11/110,222, filed Apr. 20, 2005, Gallagher, Michael, et al.
Non published commonly owned U.S. Appl. No. 11/068,445, filed Feb. 24, 2005, Gupta, Rajeev, et al.
Non published commonly owned U.S. Appl. No. 11/080,714, filed Mar. 14, 2005, Agrawal, Satish.
Non-Final Office Action of U.S. Appl. No. 11/080,714, Nov. 29, 2007 (mailing date), Agrawal, Satish.
Final Office Action of U.S. Appl. No. 11/080,714, Jul. 9, 2008 (mailing date), Agrawal, Satish.
Non published commonly owned U.S. Appl. No. 11/093,703, filed Mar. 30, 2005, Gupta, Rajeev.
Non-Final Office Action of U.S. Appl. No. 11/096,800, Aug. 24, 2006 (mailing date), Gallagher, Michael.

Non-Final Office Action of U.S. Appl. No. 11/096,800, Feb. 23, 2007 (mailing date), Gallagher, Michael.
Final Office Action of U.S. Appl. No. 11/096,800, Aug. 21, 2007 (mailing date), Gallagher, Michael.
Notice of Allowance of U.S. Appl. No. 11/096,800, Dec. 20, 2007 (mailing date), Gallagher, Michael.
Non-Final Office Action of U.S. Appl. No. 11/225,870, May 30, 2006 (mailing date), Gallagher, Michael, et al.
Non-Final Office Action of U.S. Appl. No. 11/225,398, Apr. 5, 2006 (mailing date), Gallagher, Michael, et al.
Non-Final Office Action of U.S. Appl. No. 11/225,872, May 8, 2006 (mailing date), Gallagher, Michael, et al.
Non-Final Office Action of U.S. Appl. No. 11/225,871, Mar. 30, 2006 (mailing date), Gallagher, Michael, et al.
Non-Final Office Action of U.S. Appl. No. 11/226,617, Apr. 6, 2006 (mailing date), Gallagher, Michael, et al.
Non-Final Office Action of U.S. Appl. No. 11/226,610, Mar. 29, 2006 (mailing date), Gallagher, Michael, et al.
Non-Final Office Action of U.S. Appl. No. 11/228,853, Jun. 5, 2006 (mailing date), Gallagher, Michael, et al.
Non-Final Office Action of U.S. Appl. No. 11/228,853, Nov. 22, 2006 (mailing date), Gallagher, Michael, et al.
Notice of Allowance of U.S. Appl. No. 11/228,853, Feb. 23, 2007 (mailing date), Gallagher, Michael, et al.
Non-Final Office Action of U.S. Appl. No. 11/229,470, Jun. 6, 2006 (mailing date), Gallagher, Michael, et al.
Non-Final Office Action of U.S. Appl. No. 11/229,470, Oct. 24, 2006 (mailing date), Gallagher, Michael, et al.
Non-Final Office Action of U.S. Appl. No. 11/229,470, May 22, 2007 (mailing date), Gallagher, Michael, et al.
Final Office Action of U.S. Appl. No. 11/229,470, Dec. 14, 2007 (mailing date), Gallagher, Michael, et al.
Non-Final Office Action of U.S. Appl. No. 11/229,470, Feb. 27, 2008 (mailing date), Gallagher, Michael, et al.
Non-Final Office Action of U.S. Appl. No. 11/229,470, Oct. 1, 2008 (mailing date), Gallagher, Michael, et al.
Non-Final Office Action of U.S. Appl. No. 11/227,842, Jun. 5, 2006 (mailing date), Gallagher, Michael, et al.
Non-Final Office Action of U.S. Appl. No. 11/227,573, Apr. 6, 2006 (mailing date), Gallagher, Michael, et al.
Non-Final Office Action of U.S. Appl. No. 11/227,840, Apr. 21, 2006 (mailing date), Gallagher, Michael, et al.
Non-Final Office Action of U.S. Appl. No. 11/227,784, Mar. 28, 2006 (mailing date), Gallagher, Michael, et al.
Non published Commonly owned U.S. Appl. No. 12/233,571, filed Sep. 18, 2008, Khetawat, Amit, et al.
Non published Commonly owned U.S. Appl. No. 12/187,360, filed Aug. 6, 2008, Gallagher, Michael, et al.
Non published Commonly owned U.S. Appl. No. 12/193,598, filed Aug. 18, 2008, Gallagher, Michael, et al.
Non published Commonly owned U.S. Appl. No. 12/194,442, filed Aug. 19, 2008, Gallagher, Michael, et al.
Non published Commonly owned U.S. Appl. No. 12/328,719, filed Dec. 4, 2008, Gallagher, Michael, et al.
Non published Commonly owned U.S. Appl. No. 12/328,732, filed Dec. 4, 2008, Gallagher, Michael, et al.
International Search Report and Written Opinion for PCT/US2004/042456, Apr. 27, 2005 (mailing date), Kineto Wireless, Inc.
International Preliminary Report on Patentability and Written Opinion for PCT/US2005/013807, Oct. 25, 2006 (mailing date), Kineto Wireless, Inc.
International Search Report and Written Opinion for PCT/US2005/013807, Jul. 6, 2005 (mailing date), Kineto Wireless, Inc.
International Search Report and Written Opinion for PCT/US2005/016767, Nov. 7, 2005 (mailing date), Kineto Wireless, Inc.
International Preliminary Report on Patentability and Written Opinion for PCT/US2005/016767, Nov. 14, 2006 (mailing date), Kineto Wireless, Inc.
International Search Report and Written Opinion for PCT/US2005/040689, Mar. 13, 2006 (mailing date), Kineto Wireless, Inc.
International Preliminary Report on Patentability and Written Opinion for PCT/US2005/040689, May 15, 2007 (mailing date), Kineto Wireless, Inc.

International Search Report and Written Opinion for PCT/US2005/016921, Sep. 19, 2005 (mailing date), Kineto Wireless, Inc.
International Preliminary Report on Patentability and Written Opinion for PCT/US2005/016921, Nov. 23, 2006 (mailing date), Kineto Wireless, Inc.
International Search Report and Written Opinion for PCT/US2007/083266, Apr. 2, 2008 (mailing date), Kineto Wireless, Inc.
International Search Report and Written Opinion for PCT/US2007/073557, Jul. 16, 2008 (mailing date), Kineto Wireless, Inc.
International Search Report and Written Opinion for PCT/US2007/079258, Mar. 11, 2008 (mailing date), Kineto Wireless, Inc.
International Preliminary Report for PCT/US2007/079258, Mar. 24, 2009, Kineto Wireless, Inc.
International Search Report and Written Opinion for PCT/US2008/076913, Dec. 22, 2008 (mailing date), Kineto Wireless, Inc.
*Erricson Press Release*: "Ericsson presents the Mobile@Hometm concept," Mar. 21, 2001, http://www.ericsson.com/press/archive/2001Q1/20010321-0048.html, printed Jan. 6, 2004, pp. 1-2.
Claus Lindholt Hansen et al., "Mobile@Home- a NEW 1 Use Case for Bluetooth in the Access Network," *LM Ericsson Business Unit Multi-Service Networks*, ISSLS 2002, Apr. 14-18, 2002, Seoul, Korea, www.issls-council.org/proc02/papers/S6A3m.pdf, printed Dec. 8, 2003, 10 pages.
Perkins, Charles E., "Simplified Routing for Mobile Computers Using TCP/IP, Wireless LAN Implementation," *IBM T.J. Watson Research Center*, 0-8186-2625-9/92 1992 Proceeding, IEEE Conference on Sep. 17-18, 1992, pp. 7-13.
Wu, Jon C., et al., "Intelligent Handoff for Mobile Wireless Internet," *Mobile Networks and Applications*, Jan. 6, 2001 Kluwer Academic Publishers, Manufactured in the Netherlands (2001) 67-79.
ETSI TS 124 008 V5.6.0 (Dec. 2002) Digital cellular telecommunications system (Phase 2+); Universal Mobile Telecommunications System (UMTS); Mobile radio interface Layer 3 specification; Core network protocols; Stage 3; (3GPP TS 24.008 version 5.6.0 Release 5); ETSI Standards, European Telecommunications Standards Institute, Sophia-Antipolis, FR, Dec. 2002, pp. 293-317.
ETSI TS 100 940 V7.19.1 (Apr. 2003) Digital cellular telecommunications system (Phase 2+); Mobile radio interface layer 3 specification; (3GPP TS 04.08 version 7.19.1 Release 1998); ETSI Standards, European Telecommunications Standards Institute, Sophia-Antipolis, FR, Apr. 2003, 13 pages.
"$3^{rd}$ Generation Partnership Project; Technical Specification Group Services and System Aspects; 3GPP System to Wireless Local Area Network (WLAN) Interworking; System Description (Release 6); 3GPP TS 23.234," ETSI Standards, European Telecommunications Standards Institute, Sophia-Antipo, FR, vol. 3-SA, No. V230, Nov. 2003, XP014023920, ISSN: 0000-0001.
*Digital Enhanced Cordless Telecommunications (DECT); Global System for Mobile Communications (GSM); DECT/GSM Interworking Profile (IWP); Access and Mapping* (protocol/procedure description for 3,1 kHz speech service): ETSI EN 300 370 V1.3.1 European Standard (Telecommunications Series), European Telecommunications Standards Institute, Sophia Antipolis, FR, Jan. 2001, 110 pages.
*Digital Enhanced Cordless Telecommunications (DECT); Global System for Mobile Communications (GSM); DECT/GSM Integration Based on Dual-Mode Terminals*: ETSI EN 301 242 V1.2.2 European Standard (Telecommunications Series), European Telecommunications Standards Institute, Sophia Antipolis, FR, Sep. 1999, 23 pages.
*Digital Enhanced Cordless Telecommunications (DECT); DECT/UMTS Interworking Profile (IWP); Part 1: General Description and Overview*: ETSI TS 101 863-1 V1.1.2, Technical Specification, European Telecommunications Standards Institute, Sophia Antipolis, FR, Nov. 2001, 38 pages.
*Radio Equipment and Systems (RES); Digital Enhanced Cordless Telecommunications/Global System for Mobile Communications (DECT/GSM) Interworking Profile; Profile Overview*: ETSI Technical Report, ETR 341, Source: ETSI DECT, ICS: 33.020, Reference: DTR/RES-03058. European Telecommunications Standards Institute, Sophia Antipolis, FR, Dec. 1996, 27 pages.
"Unlicensed Mobile Access (UMA); User Perspective (Stage 1);" UMA User Perspective (Stage 1) R1.0.0 Technical Specification, Sep. 1, 2004, 29 pages.

"Unlicensed Mobile Access (UMA); Architecture (Stage 2);" UMA Architecture (Stage 2) R1.0.0 Technical Specification, Sep. 1, 2004, 78 pages.

"Unlicensed Mobile Access (UMA); Protocols (Stage 3);" UMA Protocols (Stage 3) R1.0.0 Technical Specification, Sep. 1, 2004, 142 pages.

"Unlicensed Mobile Access (UMA); Architecture (Stage 2);" UMA Architecture (Stage 2) R1.0.1 Technical Specification, Oct. 8, 2004, 80 pages.

"Unlicensed Mobile Access (UMA); Protocols (Stage 3);" UMA Protocols (Stage 3) R1.0.1 Technical Specification, Oct. 8, 2004, 142 pages.

"Unlicensed Mobile Access (UMA); Architecture (Stage 2);" UMA Architecture (Stage 2) R1.0.2 Technical Specification, Nov. 3, 2004, 79 pages.

"Unlicensed Mobile Access (UMA); Protocols (Stage 3);" UMA Protocols (Stage 3) R1.0.2 Technical Specification, Nov. 5, 2004, 142 pages.

"Unlicensed Mobile Access (UMA); Architecture (Stage 2);" UMA Architecture (Stage 2) R1.0.3 Technical Specification, Feb. 28, 2005, 85 pages.

"Unlicensed Mobile Access (UMA); Protocols (Stage 3);" UMA Protocols (Stage 3) R1.0.3 Technical Specification, Feb. 26, 2005, 156 pages.

"Unlicensed Mobile Access (UMA); Architecture (Stage 2);" UMA Architecture (Stage 2) R1.0.4 Technical Specification, May 2, 2005, 87 pages.

"Unlicensed Mobile Access (UMA); Protocols (Stage 3);" UMA Protocols (Stage 3) R1.0.4 Technical Specification, May 2, 2005, 162 pages.

"3$^{rd}$ Generation Partnership Project; Technical Specification Group GSM/EDGE Radio Access Network; Generic Access to the A/Gb interface; Stage 2 (Release X);" 3GPP TS 43.318 V0.3.0, Jan. 2005, 64 pages.

"Proposal for Stage 2 description for Generic Access to A/Gb interface", Tdoc GP-050403, Jan. 24-28, 2005, 1 page.

"3$^{rd}$ Generation Partnership Project; Technical Specification Group GSM/EDGE Radio Access Network; Generic Access to the A/Gb interface; Stage 2 (Release 6)" 3GPP TS 43.318 V0.4.0, Jan. 2005, 68 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V2.0.0, Jan. 2005, 66 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.0.0, Jan. 2005, 68 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.1.0, (Jan. 2005), Apr. 2005, 68 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.2.0, Jun. 2005 68 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.3.0, Sep. 2005, 68 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.4.0, Nov. 2005, 68 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.5.0, Jan. 2006, 70 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.6.0, (Apr. 2006), May 2006, 70 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.7.0, Jul. 2006, 71 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.8.0, Nov. 2006, 71 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.9.0, Feb. 2007, 71 pages.

"3$^{rd}$ Generation Partnership Project; Technical Specification Group GSM/EDGE Radio Access Network; Generic Access to the A/Gb interface; Stage 2 (Release 6)" 3GPP TS 43.318 V6.10.0, Aug. 2007, 71 pages.

"3$^{rd}$ Generation Partnership Project; Technical Specification Group GSM/EDGE Radio Access Network; Generic Access Network (GAN); Stage 2 (Release 6)" 3GPP TS 43.318 V6.11.0, Nov. 2007, 71 pages.

"3$^{rd}$ Generation Partnership Project; Technical Specification Group GSM/EDGE Radio Access Network; Generic access to the A/Gb interface; Stage 2 (Release 7)" 3GPP TS 43.318 V7.0.0, Nov. 2006, 71 pages.

"3$^{rd}$ Generation Partnership Project; Technical Specification Group GSM/EDGE Radio Access Network; Generic access to the A/Gb interface; Stage 2 (Release 7)" 3GPP TS 43.318 V7.1.0, Feb. 2007, 71 pages.

"3$^{rd}$ Generation Partnership Project; Technical Specification Group GSM/EDGE Radio Access Network; Generic access to the A/Gb interface; Stage 2 (Release 7)" 3GPP TS 43.318 V7.2.0, May 2007, 71 pages.

3$^{rd}$ Generation Partnership Project; Technical Specification Group GSM/EDGE Radio Access Network; Generic Access to the A/Gb interface; Stage 2 (Release 7) 3GPP TS 43.318 V7.3.0, Aug. 2007, 71 pages.

3$^{rd}$ Generation Partnership Project; Technical Specification Group GSM/EDGE Radio Access Network; Generic Access Network (GAN); Stage 2 (Release 7) 3GPP TS 43.318 V7.4.0, Nov. 2007, 71 pages.

3$^{rd}$ Generation Partnership Project; Technical Specification Group GSM/EDGE Radio Access Network; Generic Access Network (GAN); Stage 2 (Release 8) 3GPP TS 43.318 V8.0.0, Nov. 2007, 122 pages.

"Proposal for Stage 3 description for Generic Access to A/Gb interface", Tdoc GP-050279, Jan. 24-28, 2005, 1 page.

"3$^{rd}$ Generation Partnership Project; Technical Specification Group GSM/EDGE Radio Access Network; Generic Access to the A/Gb interface; Mobile Generic Access Interface Layer 3 Specification (Release x)" 3GPP TS 44.318 Vx.1.0, Jan. 2005, 133 pages.

"3$^{rd}$ Generation Partnership Project; Technical Specification Group GSM/EDGE Radio Access Network; Generic Access to the A/Gb interface; Mobile Generic Access Interface Layer 3 Specification (Release x)" 3GPP TS 44.318 V0.4.0, Apr. 2005, 161 pages.

"3$^{rd}$ Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V0.5.0, Apr. 2005, 160 pages.

"3$^{rd}$ Generation Partnership Project; Technical Specification Group GSM/EDGE Radio Access Network; Generic Access to the A/Gb interface; Mobile Generic Access Interface Layer 3 Specification (Release 6)" 3GPP TS 44.318 V2.0.0, Apr. 2005, 152 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.0.0, Apr. 2005, 146 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.1.0, Jul. 2005, 149 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.2.0, Sep. 2005, 148 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.3.0, Nov. 2005, 149 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.4.0, Jan. 2006, 152 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.5.0, May 2006, 153 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.6.0, Jul. 2006, 153 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.7.0, Dec. 2006, 154 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.8.0, Mar. 2007, 154 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.9.0, Jun. 2007, 154 pages.

"3$^{rd}$ Generation Partnership Project; Technical Specification Group GSM/EDGE Radio Access Network; Generic Access (GA) to the A/Gb interface; Mobile GA interface layer 3 specification (Release 6)" 3GPP TS 44.318 V6.10.0, Sep. 2007, 153 pages.

"3$^{rd}$ Generation Partnership Project; Technical Specification Group GSM/EDGE Radio Access Network; Generic Access Network (GAN); Mobile GAN interface layer 3 specification (Release 6)" 3GPP TS 44.318 V6.11.0, Dec. 2007, 153 pages.

"3$^{rd}$ Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.0.0, Jul. 2006, 153 pages.

"3$^{rd}$ Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.1.0, Dec. 2006, 154 pages.

"3$^{rd}$ Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.2.0, Mar. 2007, 163 pages.

"3$^{rd}$ Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.3.0, Jun. 2007, 163 pages.

"3$^{rd}$ Generation Partnership Project; Technical Specification Group GSM/EDGE Radio Access Network; Generic Access (GA) to the A/Gb interface; Mobile GA interface layer 3 specification (Release 7)" 3GPP TS 44.318 V7.4.0, Sep. 2007, 167 pages.

"3$^{rd}$ Generation Partnership Project; Technical Specification Group GSM/EDGE Radio Access Network; Generic Access Network (GAN); Mobile GAN interface layer 3 specification (Release 7)" 3GPP TS 44.318 V7.5.0, Dec. 2007, 166 pages.

"3$^{rd}$ Generation Partnership Project; Technical Specification Group GSM/EDGE Radio Access Network; Generic Access Network (GAN); Mobile GAN interface layer 3 specification (Release 8)" 3GPP TS 44.318 V8.0.0, Dec. 2007, 166 pages.

International Search Report and Written Opinion of PCT/US2004/040858, Jun. 5, 2006, Kineto Wireless, Inc.

International Preliminary Report on Patentability of PCT/US2004/040858, Jun. 7, 2006, Kineto Wireless, Inc.

"Digital cellular telecommunications system (Phase 2+); Universal Mobile Telecommunications System (UMTS); Mobile radio interface Layer 3 specification; Core network protocols; Stage 3 (3GPP TS 24.008 version 5.6.0 Release 5); ETSI TS 124 008," ETSI Standards, European Telecommunications Standards Institute, Sophia-Antipo, FR, vol. 3-CN1, No. V560, Dec. 2002, pp. 293-317, XP014007949, ISSN: 0000-0001.

Updated portions of prosecution history of U.S. Appl. No. 11/080,714, filed Mar. 21, 2011, Agrawal, Satish, et al.

International Preliminary Report on Patentability for PCT/US2007/083266, May 5, 2009 (issuance date), Kineto Wireless Inc.

Portions of prosecution history of EP07844796, Jun. 29, 2010 (mailing date), Kineto Wireless Inc.

Updated portions of prosecution history of U.S. Appl. No. 11/013,883, Nov. 20, 2009, Gallagher, Michael D., et al.

Updated portions of prosecution history of U.S. Appl. No. 11/080,714, Dec. 7, 2010, Agrawal, Satish, et al.

Portions of prosecution history of U.S. Appl. No. 12/197,143, Dec. 30, 2010, Gallagher, Michael D., et al.

Updated portions of prosecution history of EP08730429, May 4, 2010, Kineto Wireless, Inc.

International Search Report for PCT/US2003/032855, Apr. 21, 2004 (mailing date), Kineto Wireless, Inc.

* cited by examiner

FEMTOCELL INTEGRATION INTO THE MACRO NETWORK

CLAIM OF BENEFIT TO RELATED APPLICATIONS

This application claims the benefit of U.S. Provisional Application 60/891,583, entitled "Methods for Unauthorized User Equipment Rejection as a Component of the Generic Access to the Iu Interface for Femtocells," filed Feb. 26, 2007; U.S. Provisional Application 60/892,800, entitled "Methods For Cell Planning as a Component of the Generic Access to the IU Interface for Femtocells," filed Mar. 2, 2007; U.S. Provisional Application 60/949,826, entitled "Generic Access to the Iu Interface," filed Jul. 13, 2007; and U.S. Provisional Application 60/956,669, entitled "Femtocell Integration Into the Macro Network," filed Aug. 17, 2007. The contents of each of these four provisional applications are hereby incorporated by reference.

FIELD OF THE INVENTION

The invention relates to telecommunication. More particularly, this invention relates to a technique for seamlessly integrating voice and data telecommunication services across licensed wireless systems, unlicensed wireless systems, and generic access networks such as the internet.

BACKGROUND OF THE INVENTION

Licensed wireless systems provide mobile wireless communications to individuals using wireless transceivers. Licensed wireless systems refer to public cellular telephone systems and/or Personal Communication Services (PCS) telephone systems. Wireless transceivers include cellular telephones, PCS telephones, wireless-enabled personal digital assistants, wireless modems, and the like.

Licensed wireless systems utilize wireless signal frequencies that are licensed from governments. Large fees are paid for access to these frequencies. Expensive base station (BS) equipment is used to support communications on licensed frequencies. Base stations are typically installed approximately a mile apart from one another (e.g., cellular towers in a cellular network). The wireless transport mechanisms and frequencies employed by typical licensed wireless systems limit both data transfer rates and range. As a result, the quality of service (voice quality and speed of data transfer) in licensed wireless systems is considerably inferior to the quality of service afforded by landline (wired) connections. Thus, the user of a licensed wireless system pays relatively high fees for relatively low quality service.

Landline (wired) connections are extensively deployed and generally perform at a lower cost with higher quality voice and higher speed data services. The problem with landline connections is that they constrain the mobility of a user. Traditionally, a physical connection to the landline was required.

In the past few years, the use of unlicensed wireless communication systems to facilitate mobile access to landline-based networks has seen rapid growth. For example, such unlicensed wireless systems may support wireless communication based on the IEEE 802.11a, b or g standards (WiFi), or the Bluetooth® standard. The mobility range associated with such systems is typically on the order of 100 meters or less. A typical unlicensed wireless communication system includes a base station comprising a wireless access point (AP) with a physical connection (e.g., coaxial, twisted pair, or optical cable) to a landline-based network. The AP has a RF transceiver to facilitate communication with a wireless handset that is operative within a modest distance of the AP, wherein the data transport rates supported by the WiFi and Bluetooth® standards are much higher than those supported by the aforementioned licensed wireless systems. Thus, this option provides higher quality services at a lower cost, but the services only extend a modest distance from the base station.

However, such unlicensed wireless communication systems require modified or dual-mode user equipment in order to allow seamless communications across both the unlicensed wireless system and the licensed system. Therefore, there is need to provide the low cost and quality of service benefits of the unlicensed wireless system without requiring change to the user equipment. As a result, technology is being developed to integrate short-range licensed wireless base stations that emulate components of the licensed wireless system and the licensed wireless system in a seamless fashion. Such seamless integration should enable a user to access, via a single handset (i.e., user equipment), the short-range licensed wireless system (i.e., femtocell system) when within the range of such a system, while accessing a licensed wireless system when out of range of the short-range licensed wireless system.

To perform such integration requires sharing of limited licensed wireless system resources and some various messaging functions needed to communicate with the licensed wireless system. Therefore, a solution is needed to overcome the limited availability of resources. Additionally, such a solution should be implemented without changing either the user equipment used to access the network or components of the network itself in order to provide a fully transparent integrated communication system.

SUMMARY OF THE INVENTION

Some embodiments of the invention provide a communication system that includes a first communication network, a second communication network, and a core network that is communicatively coupled to the first and second communication networks. The second communication network includes a network controller and a group of two or more access areas that are communicatively coupled to the core network by the network controller. Some embodiments provide a method for receiving a first area identifier associated with a first access area of the first communication network from a user equipment (UE) in a particular access area of the second communication network. A second area identifier is sent to the core network before a connection is made between the UE and the core network. The second area identifier represents a group of two or more area identifiers for the group of two or more access areas of the second communication network.

Some embodiments further include an access point for establishing an access area of the second communication network. In some such embodiments, the access point receives a message having a first area identifier that identifies the access area established by the access point. The access point replaces the first area identifier with a second area identifier and passes the message to the network control for routing to the core network.

Within the communication system, some embodiments provide a method for receiving a request from a UE. The request is for access to the second network through a particular access area of the second network. Some such embodiments determine if the UE is authorized to access the second network through the particular access area. If the UE is not authorized to access the second network through the particular access area, some embodiments repeatedly pass a set of messages to the UE to cause the UE to stop requesting access to the services of the second network.

Some embodiments provide a method for receiving a request from a UE to access the second network through a particaular access area of the second network. The particular access area has an associated area identifier. Some embodiments determine whether the UE is authorized to access the second network through the particular access area. If the UE is not authorized to access the second network through the particular access area, some embodiments pass a message to restrict the UE from accessing any access areas that specify the area identifier associated with the particular access area.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
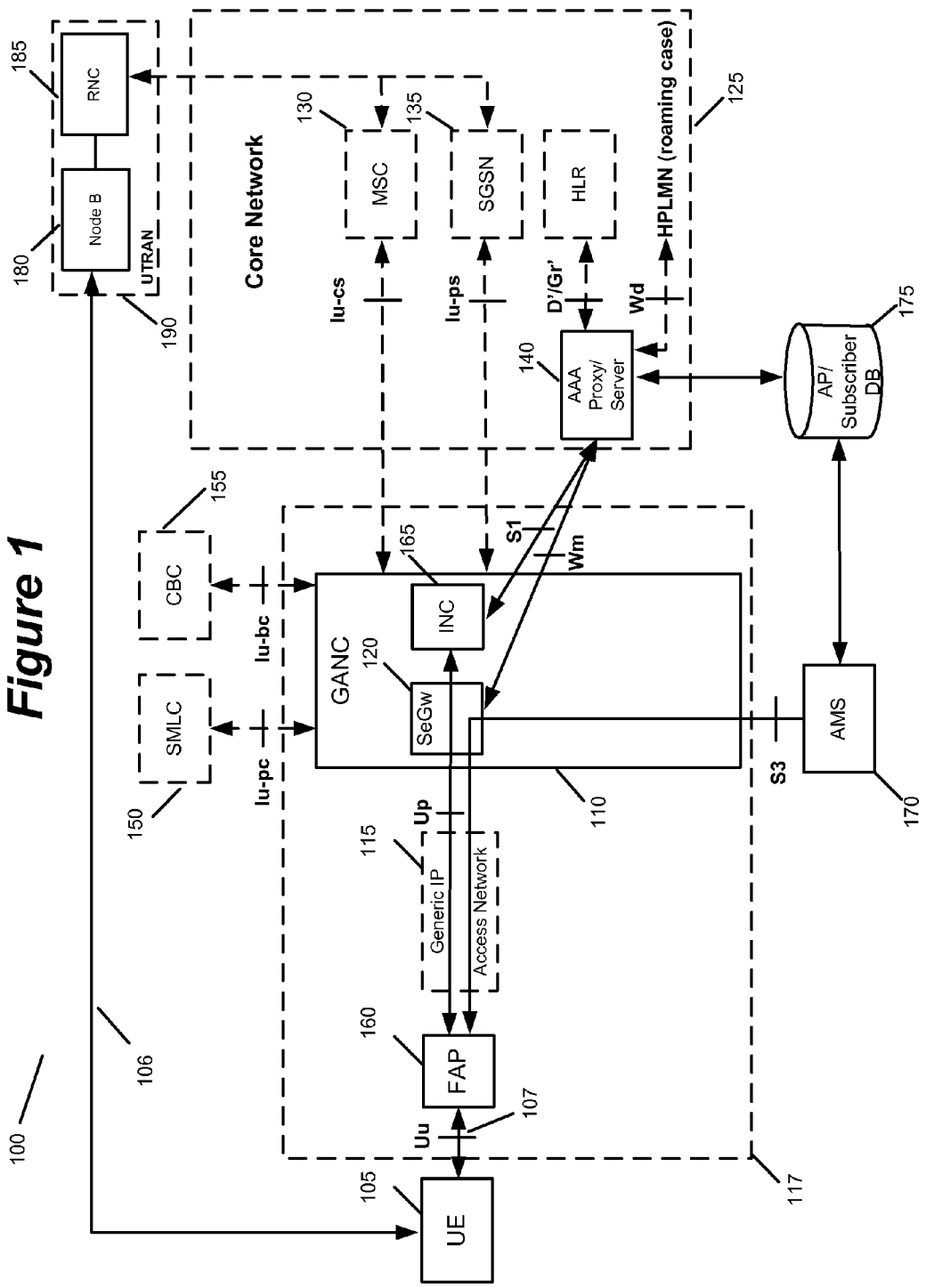
FIG. 1 illustrates an integrated communication system (ICS) architecture and the basic elements of a femtocell system in accordance with some embodiments of the present invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a communication system that includes a first communication network, a second communication network, and a core network that is communicatively coupled to the first and second communication networks. The second communication network includes a network controller and a group of two or more access areas that are communicatively coupled to the core network by the network controller. Some embodiments provide a method for receiving a first area identifier associated with a first access area of the first communication network from a user equipment (UE) in a particular access area of the second communication network. A second area identifier is sent to the core network before a connection is made between the UE and the core network. The second area identifier represents a group of two or more area identifiers for the group of two or more access areas of the second communication network.

Some embodiments further include an access point for establishing an access area of the second communication network. In some such embodiments, the access point receives a message having a first area identifier that identifies the access area established by the access point. The access point replaces the first area identifier with a second area identifier and passes the message to the network control for routing to the core network.

Within the communication system, some embodiments provide a method for receiving a request from a UE. The request is for access to the second network through a particular access area of the second network. Some such embodiments determine if the UE is authorized to access the second network through the particular access area. If the UE is not authorized to access the second network through the particular access area, some embodiments repeatedly pass a set of messages to the UE to cause the UE to stop requesting access to the services of the second network.

Some embodiments provide a method for receiving a request from a UE to access the second network through a particular access area of the second network. The particular access area has an associated area identifier. Some embodiments determine whether the UE is authorized to access the second network through the particular access area. If the UE is not authorized to access the second network through the particular access area, some embodiments pass a message to restrict the UE from accessing any access areas that specify the area identifier associated with the particular access area.

Several more detailed embodiments of the invention are described in the sections below. Section I describes the overall integrated communication system (ICS) in which some embodiments are incorporated and also contains a discussion for the system architecture of a femtocell system. Next, Section II presents the mobility management functions of femtocells in some embodiments. Femtocell service access control is discussed in Section III. Next, Section IV provides a description of a computer system with which some embodiments of the invention are implemented. Lastly, Appendix I shows a listing of the abbreviations used herein.

I. System Architecture

A. Overview of the System Architecture

FIG. 1 illustrates an integrated communication system (ICS) architecture 100 in accordance with some embodiments of the present invention. ICS architecture 100 enables user equipment (UE) 105 to access a voice and data network 125 via either (1) a licensed air interface 106 or (2) an ICS access interface 107. The ICS access interface 107 connects the UE 105 to a wireless femtocell system 117 that includes a low powered femtocell 160 which in turn communicatively couples the UE 105 through a generic IP access network 115 to a GANC 110. Through the femtocell system 117, the UE 105 alternatively accesses components of the core network (CN) 125. More specifically, a communication session between the UE 105 and an endpoint is established by the components of the CN 125. In some embodiments, the communication session through either interface includes voice services, data services, or both.

The core network 125 includes one or more Home Location Registers (HLRs) and databases 175 for subscriber authentication and authorization. Once authorized, the UE 105 may access the voice and data services of the core network 125. In order to provide such services, the core network 125 includes a Mobile Switching Center (MSC) 130 for providing access to the voice services. Data services are provided for through a Serving GPRS (General Packet Radio Service) Support Node (SGSN) 135 in conjunction with a gateway such as a Gateway GPRS Support Node (GGSN) (not shown).

The SGSN 135 is typically responsible for delivering data packets from and to the GGSN and the user equipment within the geographical service area of the SGSN 135. Additionally, the SGSN 135 may perform functionality such as mobility management, storing user profiles, and storing location information. However, the actual interface from the core network 125 to various external data packet services networks (e.g., public Internet) is facilitated by the GGSN. As the data packets originating from the user equipment typically are not structured in the format with which to access the external data networks, it is the role of the GGSN to act as the gateway into such packet services networks.

In the illustrated embodiment, the licensed wireless network depicts components common to a UMTS Terrestrial Radio Access Network (UTRAN) based cellular network that includes multiple base stations referred to as Node Bs 180 (of which only one is shown for simplicity) that facilitate wireless communication services for various user equipment 105 via respective licensed radio links 106 (e.g., radio links employing radio frequencies within a licensed bandwidth). However, one of ordinary skill in the art will recognize that in some embodiments, the licensed wireless network may include other licensed wireless networks such as GSM/GPRS and GERAN to name a few.

The licensed wireless channel 106 may comprise any licensed wireless service having a defined UTRAN or Base Station Subsystem (BSS) interface protocol (e.g., Iu-cs and Iu-ps interfaces for UTRAN or A and Gb interfaces for GSM) for a voice/data network. The UTRAN 190 typically includes at least one Node B 180 and a Radio Network Controller (RNC) 185 for managing the set of Node Bs 180. Typically, the multiple Node Bs 180 are configured in a cellular configuration (one per each cell) that covers a wide service area. Such components of the Radio Access Network (RAN) alternatively are referred to as the macro network (MN) and provide the communication interface through which UEs access the core network (CN). It should be apparent to one of ordinary skill in the art that such components depending on their range may be referred to a micro or pico networks.

Each RNC 185 communicates with components of the core network 125 through a standard radio network controller interface such as the Iu-cs and Iu-ps interfaces depicted in FIG. 1. For example, a RNC 185 communicates with the MSC 130 via the UTRAN Iu-cs interface for circuit switched voice services. Additionally, the RNC 185 communicates with the SGSN 135 via the UTRAN Iu-ps interface for packet data services. Moreover, one of ordinary skill in the art will recognize that in some embodiments, other networks with other standard interfaces may apply. For example, the RNC 185 in a GSM/GPRS network is replaced with a Base Station Controller (BSC) that communicates voice to the MSC 130 via an A interface and the BSC communicates data to the SGSN 135 via a Gb interface of the GSM/GPRS network.

In some embodiments of the ICS architecture 100, the user equipment 105 is connected to the core network (CN) 125 via a second communication network facilitated by the ICS access interface 107 and a Generic Access Network Controller (GANC) 110 (also referred to as a Universal Network Controller or UNC) of the femtocell system 117. In some embodiments, the voice and data services over the ICS access interface 107 are facilitated via a femtocell access point (FAP) 160 communicatively coupled to a broadband IP network 115. The FAP 160 creates a femtocell system access area for facilitating short-range licensed wireless communication sessions that operate independent of the licensed communication session 106. In case of the femtocell system 117, the UE 105 connects to the femtocell system 117 through the short-range licensed wireless network access area created by the FAP 160. Signals from the FAP 160 are then transmitted over the generic access IP network 115, such as a broadband network connection.

The signaling from the UE 105 is passed over the ICS access interface 107 and generic IP access network 115 to the GANC 110. After the GANC 110 performs authentication and authorization of the subscriber using the Authorization, Authentication, and Accounting (AAA) server 140, the GANC 110 communicates with components of the core network 125 using a radio network controller interface that is the same or similar to the radio network controller interface of the UTRAN described above. For instance, the GANC 110 of some embodiments includes a UTRAN Iu-cs interface for circuit switched voice services and a UTRAN Iu-ps interface for packet data services (e.g., GPRS).

In some embodiments, the GANC 110 communicates with other system components of the ICS system 100 through one or more of several other interfaces, which are (1) "Up", (2) "Wm", (3) "D'/Gr'", (4) "Gn'", and (5) "S1". The "Up" interface is the standard interface for session management between the UE 105 and the GANC 110. The "Wm" interface is a standardized interface between the GANC 110 and AAA server 140 for authentication and authorization of the UE 105 into the femtocell system 117. The "D'/Gr'" interface is the standard interface to the HLR. Optionally, some embodiments use the "Gn'" interface which is a modified interface for direct communications with the data services gateway (e.g., GGSN) of the core network.

Some embodiments optionally include the "S1" interface. In these embodiments, the "S1" interface provides an authorization and authentication interface from the GANC 110 to the AAA server 140. In some embodiments, the AAA server 140 that supports the S1 interface and the AAA server 140 that supports Wm interface may be the same. More details of the S1 interface are described in U.S. application Ser. No. 11/349,025, entitled "Service Access Control Interface for an Unlicensed Wireless Communication System", filed Feb. 6, 2006, now issued U.S. Pat. No. 7,283,822. Additionally, in some embodiments, the GANC 110 communicates with a Serving Mobile Location Center (SMLC) 150 for supporting location services over an Iu-pc interface and a Cell Broadcast Center (CBC) 155 for supporting cell broadcast services over an interface Iu-bc interface.

In some embodiments, the UE 105 must register with the GANC 110 prior to accessing the femtocell system 117. Registration information of some embodiments includes a subscriber's International Mobile Subscriber Identity (IMSI), a Media Access Control (MAC) address, and a Service Set Identifier (SSID) of the serving access point as well as the cell identity from the GSM or UTRAN cell upon which the UE 105 is already camped. In some embodiments, the GANC 110 may pass this information to the AAA server 140 to authenticate the subscriber and determine the services (e.g., voice and data) available to the subscriber. If approved by the AAA 140 for access, the GANC 110 will permit the UE 105 to access voice and data services of the femtocell system 117. These voice and data services are seamlessly provided by the femtocell system 117 to the UE 105 through the various interfaces described above. A further description of the ICS architecture 100 is provided within the U.S. Provisional Application 60/949,826 which is incorporated herein by reference.

B. Wireless Femtocell Communication System

As described in FIG. 1, the femtocell system of some embodiments includes a Femtocell Access Point (FAP) 160 which communicatively couples the UE 105 to the GANC 110 through the Generic IP Access Network 115. In FIG. 1, the interface between the UE 105 and the FAP 160 is referred to as the Uu interface. The UE 105 and the FAP 160 communicate through a short-range wireless air interface using licensed wireless frequencies. The Security Gateway (SeGW) 120 component of the GANC 110 terminates secure remote access tunnels from the FAP 160, providing mutual authentication, encryption and data integrity for signaling, voice and data traffic.

The Femtocell Access Point (FAP) Management System (AMS) 170 is used to manage a large number of FAPs. The AMS 170 functions include configuration, failure management, diagnostics, monitoring and software upgrades. The interface between the AMS 170 and the SeGW 120 is referred to as the S3 interface. The S3 interface enables secure access to femtocell access point management services for FAPs. All communication between the FAPs and AMS is exchanged via the femtocell secure tunnel that is established between the FAP and SeGW 120. As shown, the AMS 170 accesses the AP/subscriber databases (femtocell DB) 175 which provides centralized data storage facility for the FAPs and subscriber information. Multiple femtocell system elements may access femtocell DB via AAA server.

The IP Network Controller (INC) 165 component of the GANC 110 interfaces with the AAA/proxy server 140 through the S1 interface for provisioning of the FAP related information and service access control. As shown in FIG. 1, the AAA/proxy server 140 also interfaces with the AP/subscriber databases 175.

1. Functional Entities i. User Equipment (UE)

The UE 105 contains the functions that are required to access the femtocell system 117. The UE 105 can support either Bluetooth® or IEEE 802.11 protocols. In some embodiments, the UE 105 supports an IP interface to the access point. In these embodiments, the IP connection from the GANC 110 extends all the way to the UE 105.

In some embodiments, the UE 105 is a standard 3G handset device operating over licensed spectrum of the provider. In some embodiments, the UE 105 includes a cellular telephone, smart phone, personal digital assistant, or computer equipped with a subscriber identity mobile (SIM) card for communicating over the licensed or unlicensed wireless networks. Moreover, in some embodiments the computer equipped with the SIM card communicates through a wired communication network.

Alternatively, in some embodiments the UE 105 includes a fixed wireless device providing a set of terminal adapter functions for connecting Integrated Services Digital Network (ISDN), Session Initiation Protocol (SIP), or Plain Old Telephone Service (POTS) terminals to the ICS. Application of the present invention to this type of device enables the wireless service provider to offer the so-called landline replacement service to users, even for user locations not sufficiently covered by the licensed wireless network. Moreover, some embodiments of the terminal adapters are fixed wired devices for connecting ISDN, SIP, or POTS terminals to a different communication network (e.g., IP network) though alternate embodiments of the terminal adapters provide wireless equivalent functionality for connecting through unlicensed or licensed wireless networks.

ii. Femtocell Access Point (FAP)

The FAP 160 is a licensed access point which offers a standard radio interface (Uu) for UE connectivity. The FAP 160 provides radio access network connectivity for the UE 105 using a modified version of the standard GAN interface (Up). The FAP 160 generates a short-range licensed wireless signal detectable by the UE 105 when within range of the signal generated by the FAP 160. Typically, this range spans an area of a few tens of meters whereas a macro cell of the macro network typically spans tens of kilometers. In other words, the coverage area generated by the FAP is a micro cell that has a range that is 100, 1000, or more times less than a macro cell of the macro network. To the UE 105, the FAP's 160 signal appears as a signal from a new cell of the macro network. Therefore, the UE 105 is unable to distinguish the FAP 160 from other Node B's 180 or base stations of the macro network. In some embodiments, the FAP 160 is equipped with either a standard 3G USIM or a 2G SIM.

In accordance with some embodiments, the FAP 160 will be located in a fixed structure, such as a home or an office building. In some embodiments, the service area of the FAP 160 includes an indoor portion of a building, although it will be understood that the service area may include an outdoor portion of a building or campus. Some macro networks may not provide adequate signal strength or quality of service in such area. However, by placing a FAP 160 in such areas, the FAP 160 is able to extend the serviceable coverage area available to the UE 105 without impact to the macro or core network.

iii. Generic Access Network Controller (GANC)

The GANC 110 is an enhanced version of the GANC defined in the 3GPP TS 43.318 document "Generic access to the A/Gb interface; Stage 2". The GANC 110 appears to the core network as a UTRAN Radio Network Controller (RNC). The GANC 110 includes a Security Gateway (SeGW) 120 and IP Network Controller (INC) 165. In some embodiments, the GANC also includes GANC Signaling Gateway, a GANC Media Gateway (MGW), and/or an ATM Gateway (not shown).

The SeGW 120 provides functions that are defined in the 3GPP document titled "Generic access to the A/Gb interface; Stage 2" and the 3GPP TS 44.318 document titled "Generic access to the A/Gb interface; Stage 3". The SeGW 120 terminates secure access tunnels from the FAP, provides mutual authentication, encryption, and data integrity for signaling, voice, and data traffic. The SeGW 120 is required to support EAP-SIM and EAP-AKA authentication for the FAP 160.

The INC 165 is the core GANC element. In some embodiments, the INC 165 is front-ended with a load balancing router/switch subsystem which connects the INC 165 to the other GAN systems; e.g., GANC security gateways, local or remote management systems, etc.

iv. Generic IP Access Network

The generic IP access network 115 represents all the elements that collectively, support IP connectivity between the GANC Security Gateway (SeGW) 120 function and the FAP 160. This includes: (1) other customer premise equipment (e.g., DSL/cable modem, WLAN switch, residential gateways/routers, switches, hubs, WLAN access points), (2) network systems specific to the broadband access technology (e.g., DSLAM or CMTS), (3) ISP IP network systems (edge routers, core routers, firewalls), (4) wireless service provider (WSP) IP network systems (edge routers, core routers, firewalls), and (5) network address translation (NAT) functions, either standalone or integrated into one or more of the above systems.

v. AP Management System (AMS)

The AMS 170 is used to manage a large number of FAPs 160 including configuration, failure management, diagnostics, monitoring, and software upgrades. The access to AMS functionality is provided over a secure interface via the GANC SeGW 120.

Some embodiments of the above mentioned devices, such as the user equipment 105, FAP 160, or GANC 110, include electronic components, such as microprocessors and memory (not shown), that store computer program instructions for executing wireless protocols for managing voice and data services in a machine-readable or computer-readable medium as further described below in the section labeled "Computer System". Examples of machine-readable media or computer-readable media include, but are not limited to magnetic media such as hard disks, memory modules, magnetic tape, optical media such as CD-ROMS and holographic devices, magneto-optical media such as optical disks, and hardware devices that are specially configured to store and execute program code, such as application specific integrated circuits (ASICs), programmable logic devices (PLDs), ROM, and RAM devices. Examples of computer programs or computer code include machine code, such as produced by a compiler, and files containing higher-level code that are executed by a computer, an electronic component, or a microprocessor using an interpreter.

II. Femtocell Mobility Management

In some embodiments, the FAP provides the UE with access to the operator core network through the femtocell system in a manner that is transparent to the UE. In other words, the UE while communicating through the femtocell system to reach the operator core network, does not need to differentiate a communication session as going through the femtocell system or directly through the UTRAN. Additionally, no changes are needed to the UE for the UE to access the operator core network through the femtocell system. Hence, the FAP transparently operates in a same or similar manner to that of Node Bs or other base stations of the various macro networks.

The transparent operation permits the femtocell system to utilize the components of the core network to establish and route communication sessions for user equipment that are authorized to communicate directly with the licensed network. The MSC of the core network establishes and routes circuit-switched services for the femtocell system and creates the physical connection to and from the service area of the femtocell system and a destination endpoint located outside the service area. The SGSN of the core network establishes and routes packet-switched services for the femtocell system and creates the physical connection to and from the service area of the femtocell system and a destination endpoint.

In some embodiments of the invention, a UE roaming from a service area of the macro network into a service area of the femtocell system will utilize the same MSC or SGSN of the core network to route the UE communications as when the UE is located within the service area of the macro network only. The process for determining which MSC or SGSN of the core network routes the communication of the UE when within the service area of femtocell system is described in detail below.

The role of the GANC is to function as a network controller that facilitates the establishment of the communication session by communicatively coupling the service areas of the femtocell system to the components of the core network. Specifically, the GANC routes the communication session to the MSC or SGSN which then forward the communication session over the established connection to an endpoint. In this manner, the service areas of the femtocell system continue to operate outside and independent from the core network while the core network provides the actual circuit-switched or packet-switched service establishment and connection to a destination. It should be apparent to one of ordinary skill in the art that even though circuit-switching and packet-switching services are established and provided by the core network, various control signalling used by the UE to establish such communication sessions may instead be processed by the FAP or GANC of the femtocell system.

A. Location Area, Routing Area, and Service Area Identification

Some embodiments establish such transparency by adopting and integrating various mobility management features of the macro network into the FAP and other components of the femtocell system, such as the GANC. Mobility Management is facilitated within a UMTS macro network by splitting the coverage area of the macro network into logical registration areas called Location Areas (for circuit switched domains, i.e., CS domains) and Routing Areas (for packet switched domains, i.e., PS domains). When a UE roves into any one such Location Area (LA) or Routing Area (RA), the UE performs an expected sequence of events, such as performing a location update to notify the network of its location.

Figure 2:
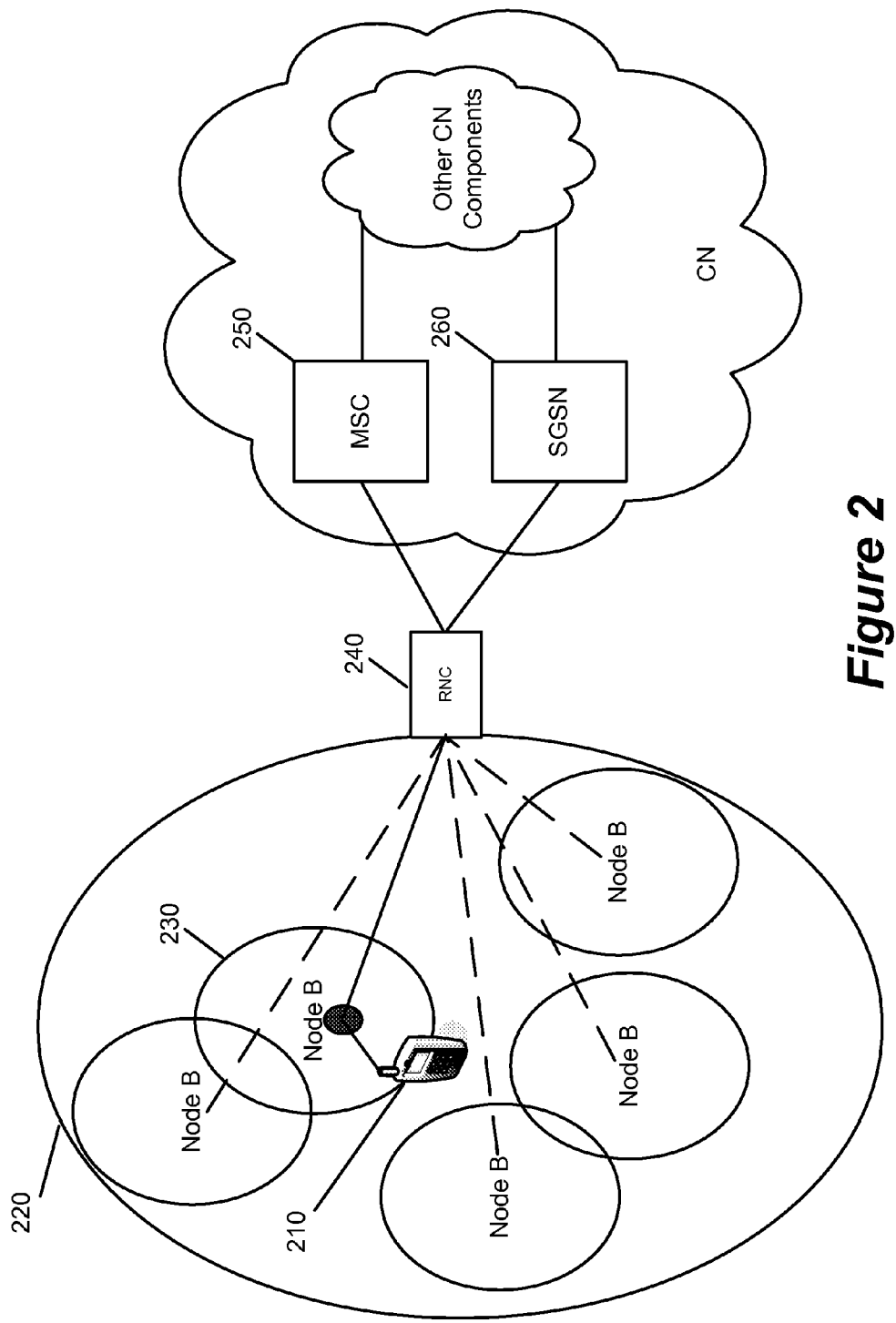
FIG. 2 illustrates the various components of a macro network involved in performing mobility management.

FIG. 2 illustrates the various components of a macro network involved in performing mobility management with a UE and the core network. In FIG. 2, an LA or RA 220 typically includes a set of node Bs (such as 230) or other base stations that represent a set of cells within the LA or RA 220. The cells within the LA or RA 220 communicate with a single RNC 240 or other base transceiver station (BTS). The RNC or BTS forwards the communications or service requests from the cells to an appropriate MSC 250 for circuit switched services or SGSN 260 for packet switched services as described above with reference to FIG. 1. Therefore, a single MSC 250 services one or more LAs and a single SGSN 260 services one or more RAs.

Using the last known LA (for CS domain) or RA (for PS domain) of the UE 210, the macro network can identify the location of the UE 210 as it traverses the various cells within an LA or RA 220 irrespective of whether the UE 210 is in idle mode or whether the UE 210 does not have any active RRC connections. The macro network will utilize the last known LA and RA for paging of the UE 210 when active radio connections are not available. However, should the UE 210 cross into a new LA or RA, mobility management requires the UE 210 to initiate a location update message to notify the macro network of its movement.

The mobility management features of the macro network identify each LA by associating a location area identifier (LAI) to the LA. The MSC/VLR of the core network uses the LAI to identify and route the communications from a particular LA to the core network and back to the particular LA. Similarly, each RA is associated with a routing area identifier (RAI). The SGSN of the core network uses the RAI to identify and route the data from a particular RA to the core network and back to the particular RA.

An LAI includes a Mobile Country Code (MCC), Mobile Network Code (MNC), and a Location Area Code (LAC). The MCC identifies the country in which the macro network is located and is typically the same three digit value found within the international mobile subscriber identity (IMSI) of the UE SIM. The MNC identifies the macro network within the country specified in the MCC. The MNC also takes the same value as the two or three digit MNC found within the IMSI of the UE SIM. The LAC is the specific field within the LAI to uniquely identify the LA from other LAs serviced by the MSC. The LAC typically includes a two octet fixed length code for identifying the LA. From the LAC parameter, the MSC determines the current or previous location of the UE within the macro network.

An RAI includes the MCC, MNC, and LAC parameters described above with reference to the LAI, but the RAI also includes an additional field to specify a Routing Area Code (RAC). The RAC typically includes a single octet fixed length code for identifying the RA within a particular LA.

As described above, the LA or RA represent the identification used by an RNC or other base transceiver station to communicate with the MSC or SGSN. However, when a particular cell within the LA directly communicates with a UE, each cell is assigned a Cell Identity (CI). The cells use such parameters when communicating with the RNCs or other base transceiver stations. The CI is an identifier to uniquely identify the cell within the LA in which it is located.

Additionally, some macro networks specify a Service Area Identifier (SAI) to identify an area including one or more cells belonging to the same LA. The SAI is a subset of the location area and can be used for indicating the location of a UE to the macro network. SAI can also be used for emergency call routing and billing purposes. The SAI includes a Public Land Mobile Network identifier (PLMN-Id), LAC, and Service Area Code (SAC). The PLMN-Id uniquely identifies the macro network. The PLMN-Id is typically a concatenation of the MCC and MNC and therefore, the SAI includes the LAI and a 16 bit SAC.

Figure 3:
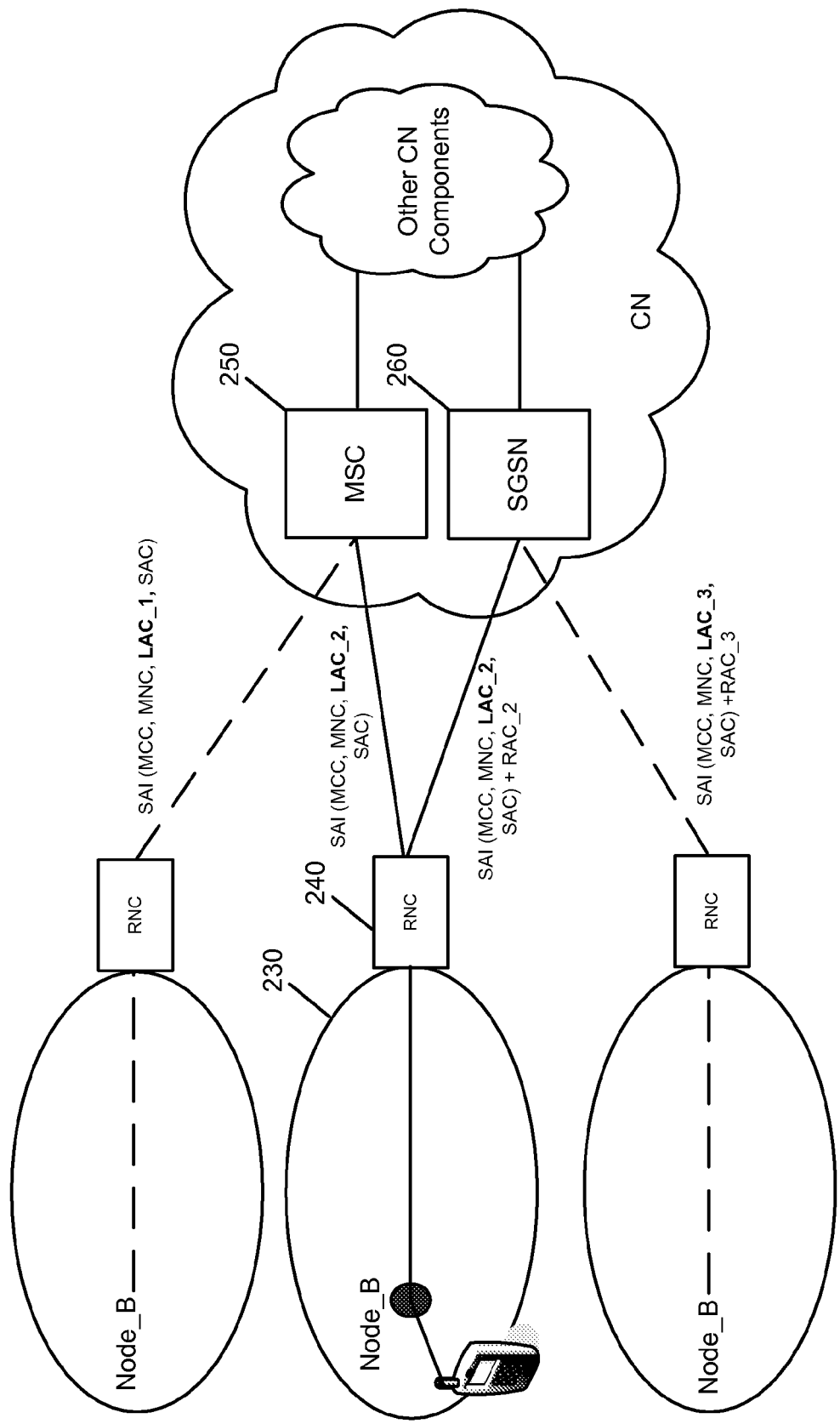
FIG. 3 illustrates the identifiers used in communications between the macro network and the core network.

FIGS. 2 and 3 illustrate the macro network's use of some or all such identifiers to perform mobility management and to deliver communications (e.g., voice calls), data requests (e.g., SMS messaging, text messaging, accessing the internet, etc.), and other services to the UE. In FIG. 2, the UE 210 may traverse the various cells within a LA 220 of a macro network. As the signal strength of a neighboring cell increases and the signal strength of the current cell declines, the UE 210 will initiate a cell reselection. Cell reselection allows the UE 210 to operate via the cell with the strongest signal. The procedure for cell reselection is provided in the 3GPP TS 25.304 document titled "User Equipment (UE) procedures in idle mode and procedures for cell reselection in connected mode". Therefore in FIG. 2, the UE 210 connects to a cell of the LA 220 with the strongest available signal, such as the Node B 230. The Node B 230 passes the service requests to the RNC 240 that services the particular LA 220 in which the Node B 230 is located. The RNC 240 then passes the service requests to an associated MSC 250 or SGSN 260 for further processing within the core network.

FIG. 3 illustrates the identifiers used in communications between the macro network and the core network. In the communication between the RNC 240 and the MSC 250, the particular identifier used by the MSC 250 to identify the originating RNC 240 is the LAC parameter. The LAC identifies for the MSC 250 the specific LA from which the request originated and the corresponding RNC 240 of the LA. Similarly, the SGSN 260 utilizes the RAC parameter to identify the originating RA, therefore the RAC parameter is provided in conjunction with the LAC in communications with the SGSN 260. Additional identifiers are typically passed along with the LAC and RAC. For instance, the RNC 240 passes the service area identifier (SAI) to the MSC 250. The SAI includes the MCC, MNC, LAC, and a two octet service area code (SAC). The SAI identifies an area within the LA that includes one or more cells that belong to the same LA. The SAC is defined by the service operator and set within the RNC.

Therefore, in order for the femtocell system to transparently provide functionality to the UE, the FAPs of some embodiments utilize a mobility management and identification scheme similar to that of the macro network. As a result, the UE will be unable to distinguish between FAPs of the femtocell system and base stations of the macro network. Therefore, service can be provided to the UE through the femtocell system without requiring any modifications to the UE and no modification to the components of the macro or core networks. Section B below provides a detailed description of the femtocell mobility management.

B. Femtocell System Mobility Management

Figure 4:
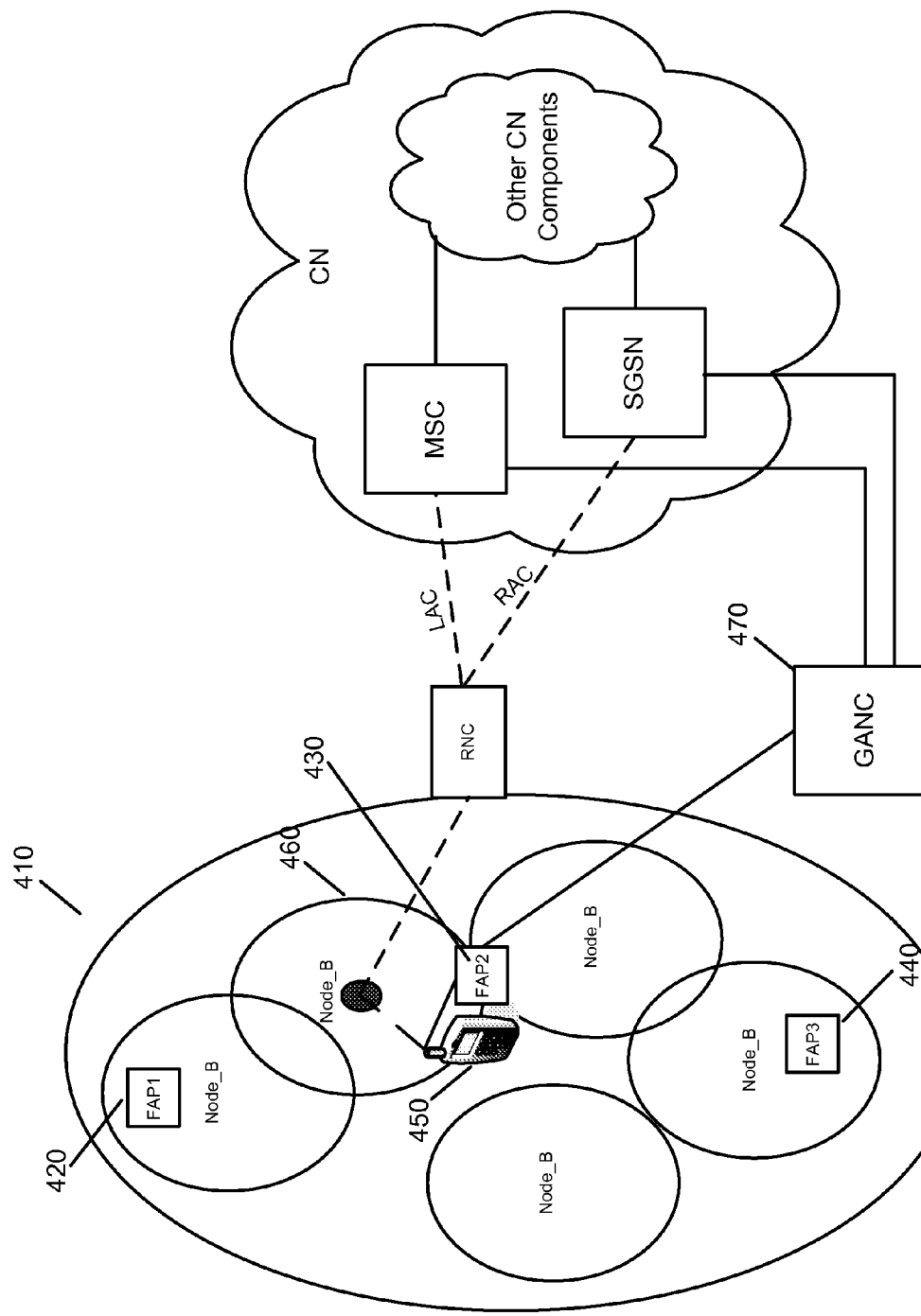
FIG. 4 illustrates the transparent operation of multiple FAPs of a femtocell system, within a location area (LA) of a macro network.

FIG. 4 illustrates the transparent operation of multiple FAPs of a femtocell system within a location area (LA) of a macro network. FIG. 4 illustrates the components of the macro and core networks, such as the Node B's, RNC, MSC, and SGSN. Also included within FIG. 4 are the components of the femtocell system, such as the FAPs 420-440 and GANC 470 that are seamlessly integrated with the core network.

The interface into the seamlessly integrated femtocell system is provided via the FAPs 420-440. The FAPs 420-440 generate short-range licensed wireless coverage areas via signals that are the same or similar to those of the Node Bs within the LA 410. The UE 450 detects the femtocell coverage areas created by the FAPs 420-440 as the UE 450 traverses through the LA 410. As the UE 450 nears the coverage area of the FAP 430, the signal strength increases.

In FIG. 4, the UE 450 is close enough to the FAP 430 where it can proceed with communications and data service over the femtocell system instead of the macro network. To connect to the femtocell system, the UE's cell reselection triggers a series of mobility management operations between the FAP 430 and the UE 450. In some embodiments, such cell reselection causes the macro network to perform a handover of service. After handover, communications and data travel from the UE 450 to the FAP 430 and into the core network via the GANC 470 as opposed to traveling through the Node B 460 of the macro network.

In some embodiments, the UE FAP selection (i.e., rove-in to FAP coverage area) can be enhanced via two possible mechanisms: (1) the FAP cell can be in a different HPLMN (equivalent PLMN list) and will be selected via preferred equivalent PLMN selection. This assumes that the UE's current camped macro cell is not in the equivalent PLMN list, and (2) the macro network will broadcast system information so that the UE shall prefer the FAP over other cells of the macro network so long as the FAP meets certain minimum parameters. The broadcast system information from the macro network may include various biasing parameters that cause the UE 450 to select the FAP 430 over other base stations of the macro network.

In some embodiments, femtocell mobility management occurs while the UE operates in idle mode. Without such idle mode mobility management, UEs operating in idle mode can rove into and camp on a particular FAP via their internal cell selection logic without the FAP's knowledge. The FAP would only become aware of the UE's presence, when the UE returns to active mode to perform various functionality. As a result, a UE could camp on a FAP that it is not authorized to access (i.e., not within the FAP's service access control) and rejection of the UE would not occur until the UE returns to active mode and attempts to register with or initiate a service request with the FAP. It should be apparent to one of ordinary skill in the art, that such UE idle mode camping may occur when the UE switches from a cell of the macro network to a FAP of the femtocell system or when the UE switches from one FAP to a neighboring FAP.

In order to trigger an initial message from an idle mode UE, the FAPs of some embodiments are assigned location areas that are distinct from those of neighboring macro cells and other neighboring FAPs. By assigning distinct LAs to the FAPs, the UE will initiate a message exchange with the FAP whenever the UE camps on a FAP. This message exchange occurs as a result of the UE having to update its location to the core network since the UE believes it has entered a new LA.

However, the number of available LACs is limited. This is due to the maximum of 65,536 available LACs (i.e., the 16 bit LAC attribute) as specified in the 3GPP TS 23.003 document "Numbering, addressing and identification". As a result, some embodiments of the femtocell system provide a LAC allocation scheme that maximizes the number of LACs available for allocation to the femtocell system, while minimizing the number of LACs used when integrating the femtocell system with the core network. As such, some embodiments of the femtocell system are able to provide a transparent and scalable solution that only minimally impacts the available resources of the macro and/or core networks.

i. Super LA/RA Mobility Management

Some embodiments of the femtocell system utilize a two-tiered LAC allocation scheme to maximize the number of supported femtocells with distinct LAs, while at the same time making the entire femtocell system transparent to the UE, macro network, and core network. The two-tiered LAC allocation scheme of some embodiments specifies (1) a first tier for a large set of Local LACs managed by the FAP/AMS used in communications with a UE and (2) a second tier for a small set of Super LACs (example: one per "Iu" interface) managed by the INC used in communications with components (e.g., MSC and SGSN) of the core network. Some embodiments perform a translation of the Local LACs to the Super LACs before transmitting communications or data to the core network. In this manner, the macro and/or core network is unaware of the Local LACs assigned to the FAPs. Instead, the macro and/or core network sees the translated Super LAC that is shared amongst the several FAPs operating through a single GANC.

In some embodiments, the first set of Local LACs is used by the FAP/AMS to assign a unique LAC to each FAP such that it meets the following requirements at the minimum: (1) uniqueness with regards to the neighboring macro cells as well as other FAPs in order to ensure an initial message from the UE upon femtocell selection and rove-in and (2) resolve conflicts with shared LACs where multiple FAPs sharing the same LAC are not neighbors but accessed by the same UE in order to allow the use of the "LA not allowed" rejection code or other appropriate reject codes using the LOCATION UPDATING REJECT message for UE rejection as will be described in Section IV below. Since these Local LACs are never exposed to the core network and these local LACs can be shared between multiple non-neighboring FAPs, the GANC servicing the FAPs can support a much larger number of FAPs (greater than 65K FAPs due to local LAC sharing). The actual number of local LAC and the Super LAC available for the femtocell system will be dependent on various deployments (several factors may need to be taken into consideration such as the LACs in use for existing macro coverage of an operator, the LACs reserved for future expansion of the macro coverage, the number of FAPs to be deployed, etc.).

In some embodiments, selection of the distinct Local LAC occurs at the time of FAP registration with the femtocell system. During registration, the FAP receives from the FAP AMS a set of unused and available Local LACs. The FAP AMS maintains this centralized list and performs an update to the list whenever a FAP is added or removed from the femtocell system. Specifically, when a FAP attempts to connect to or disconnect from a particular GANC of the femtocell system.

The FAPs of some embodiments select from the received set a unique Local LAC that does not conflict with Local LACs allocated to other neighbouring FAPs or cells of the macro network. For instance, the FAPs of some embodiments detect the LACs advertised by cells of the macro network and other neighbouring FAPs and therefore select a non-conflicting Local LAC based on the detected neighbouring LACs. If a Local LAC is found that does not conflict with any advertised LAC, then the FAP will allocate itself the Local LAC and report the allocation back to the FAP AMS.

However, it should be apparent to one of ordinary skill in the art that Local LAC selection for the FAP may be conducted by various other components of the femtocell system. For instance, in some embodiments the GANC or AAA server of the femtocell system performs the Local LAC selection. Furthermore, in some embodiments, allocating a distinct LAC for each FAP also specifies assigning a distinct RAC to each FAP. In some embodiments, the set of available LACs and RACs are sent to the FAP as part of "System Information" upon successful registration of FAP.

In some embodiments, the second set of Super LACs (a much smaller set) is managed within each INC with the following key requirements: (1) minimize the impact on the existing macro and core network components (e.g., minimal configuration, operational impact, or resource utilization), (2) seamlessly integrate the existing functionality for routing of emergency calls to appropriate PSAPs, and (3) seamlessly integrate existing functionality for the generation of appropriate call detail recording (CDR) in order to perform billing services.

To meet the above requirements for the second set of Super LACs, the INCs of some embodiments represent a "SuperLA" for a given Iu interface (i.e., MSC+SGSN interface). This implies that the MSC/SGSN can be configured with a single Super LAI/Super RAI information for that INC. More specifically, the MSC/SGSN can be configured with a single Super LAI/Super RAI information for all FAPs serviced by the particular INC. However, it should be apparent to one of ordinary skill in the art that in some embodiments, multiple Super LAIs/Super RAIs can be assigned if necessary to further subdivide the region served by a single INC into multiple geographic areas.

The Super LAI/RAI information is provided by the INC to each connected FAP. In some embodiments, the INC provides the Super LAI/RAI information to the FAP at the time of FAP registration (i.e., FAP powers on and attempts connects to the femtocell system). In some embodiments, the FAP is expected to provide Super LAC/RAC replacement in the messages from the femtocell network to the UE. For instance, the FAP must replace the "Super LAC/RAC" contained in the relevant messages from the network with the appropriate locally assigned LAC/RAC information in messages sent to the UEs camped on the FAP. Additionally, after the UE has camped on the FAP and an initial message exchange (i.e., location update) is completed between the UE and the femtocell system, the FAP of some embodiments performs Local LAC/RAC to Super LAC/RAC conversion for all subsequent message exchanges between the UE and the core network. For instance, the FAP replaces Local LAC/RAC information with Super LAC/RAC information in messages received from the UE passing through the FAP en route to a destination within the core network and the FAP replaces Super LAC/RAC information with Local LAC/RAC information in messages received from the core network passing through the FAP en route to the UE.

Using the Local LAC to Super LAC conversion, the FAPs for a given GANC no longer have to compete with an entire region serviced by a MSC when allocating the Local LACs. Instead, the GANC is the interface for the multitude of FAPs into the core network. The GANC's assigned Super LAC must remain distinct from the other components communicating (i.e., other GANCs) with the MSC. As the MSC is never exposed to the Local LACs, the FAPs need only compete with neighboring FAPs and neighboring cells of the macro network. In this manner, the available pool of Local LACs assignable to the FAPs is greatly increased. Additionally, usage of the macro and/or core network's resources (e.g., LAC allocation) is greatly reduced as all such FAPs serviced by the single GANC utilize the single shared Super LAC of the GANC when communicating with the MSC of the core network.

It should be apparent to one of ordinary skill in the art that the messaging between the GANC and the core network may include additional identifiers or parameters. Specifically, in some embodiments, the INC allocates a SAI (i.e., LAI and Service Area Code (SAC)) in its messaging with the core network. Some such embodiments utilize the additional parameters for routing emergency calls to the appropriate PSAP and also for billing purposes. In some such embodiments, the SAI is relayed to the CN by the INC in the "Initial UE message" (used to transfer initial L3 message from UE to the CN).

Figure 5:
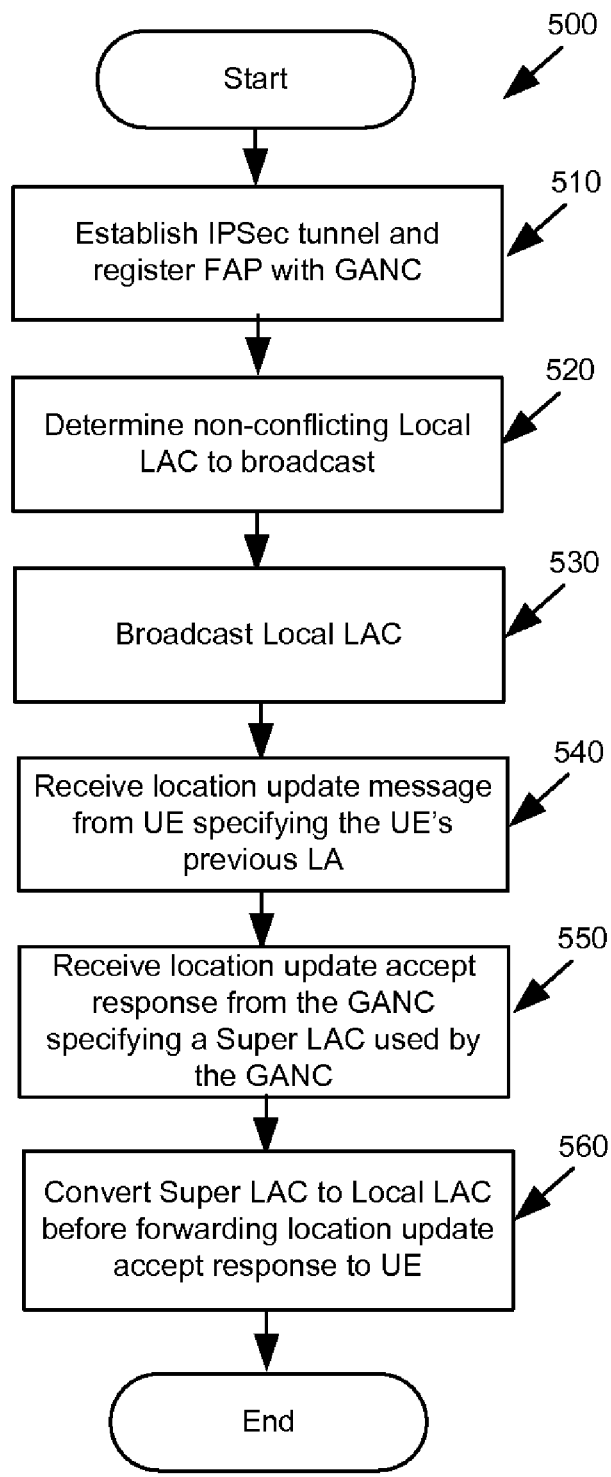
FIG. 5 presents a process that conceptually illustrates several operations performed by a FAP to implement the Local LAC to Super LAC translation when a UE roves into the coverage area of the FAP.

FIG. 5 presents a process 500 that conceptually illustrates several operations performed by a FAP to implement the Local LAC to Super LAC translation when a UE roves into the coverage area of the FAP. The process 500 begins when the FAP initially establishes (at 510) an IPSec tunnel and registers with a GANC of the femtocell system. FAP registration serves the following purposes: (1) it informs the INC of the GANC that a FAP is now connected and is available at a particular IP address, (2) it allows the femtocell system to provide the service access control and accounting functions (e.g., FAP restriction and redirection), and (3) it provides the FAP with the operating parameters (such as the Super LAC assigned to the INC, Cell-Id, etc.) associated with the femtocell service at the current location. Such operating parameters can be passed to the FAP via the "System Information" in the "REGISTRATION ACCEPT" message. The FAP of some embodiments utilizes the information to transmit system parameters to the UE over the broadcast control channel (BCCH).

The process determines (at 520) a Local LAC for the FAP that does not conflict with neighboring FAPs or neighboring cells of a macro network. As described above, the FAP receives a pool of available Local LACs and selects a Local LAC from the pool that is distinct from other detected LACs of neighboring macro cells and Local LACs of other FAPs within range of the current FAP. The FAP broadcasts (at 530) the Local LAC to any UE within the coverage area of the FAP. If a UE roves into the coverage area of the FAP, the UE will identify the Local LAC broadcast by the FAP. The UE records the broadcast Local LAC and acknowledges that it is now operating within a new location area by performing a location update. The location update messaging from the UE includes a previous LAI (i.e., MCC, MNC, and LAC). The process receives (at 540) the location update message and forwards the message to the GANC.

After processing by the GANC, the process receives (at 550) a location update accept response from the GANC. The response includes a Super LAC used by the GANC to communicate with the core network. The accept response may also include the temporary mobile subscriber identity (TMSI) in addition to or instead of the IMSI of the UE. The process converts (at 560) the Super LAC found within the response message to the Local LAC of the FAP before passing the location update accept response to the UE. In some embodiments, the GANC will have provided the FAP with the Super LAC identifier at the time of FAP registration.

Upon receiving the response message, the UE will internally update its current location area and subsequent communications and message exchanges will continue through the femtocell until the UE roves out of the coverage area of the FAP. Accordingly, the femtocell mobility management scheme used by some embodiments of the invention allows for the UE to transparently connect to the core network through the femtocell system while making such a connection indistinguishable from other macro network connections. The UE connects to the femtocell system using the same messaging and identification scheme that the UE would ordinarily use to connect to cells of the macro network.

Figure 6:
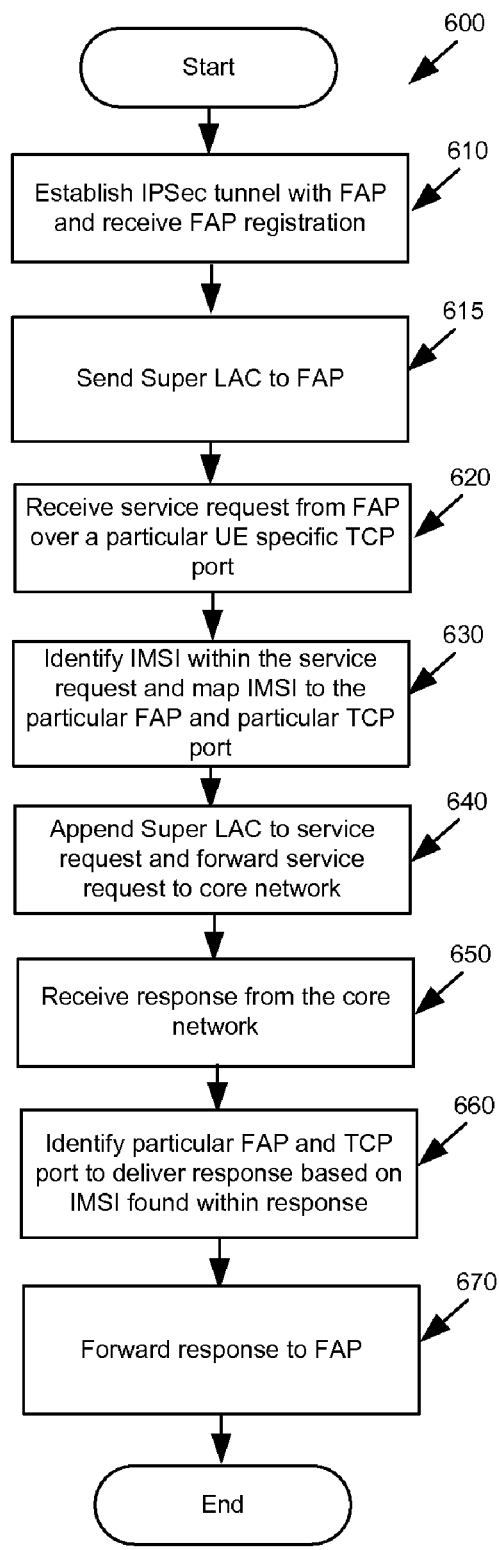
FIG. 6 presents a process that conceptually illustrates several operations performed by a GANC to implement the Local LAC to Super LAC translation in conjunction with the process of FIG. 5.

FIG. 6 presents a process 600 that conceptually illustrates several operations performed by a GANC to implement the Local LAC to Super LAC translation in conjunction with the process of FIG. 5. The process 600 begins with the establishment (at 610) of the IPSec tunnel between the FAP and the GANC, similar to 510 of FIG. 5. The process sends (at 615) a Super LAC to the FAP to be used by the FAP in the Local LAC to Super LAC conversion process for subsequent message exchanges as described in FIG. 8 below. The process then receives (at 620) a service request from the FAP over a particular TCP port allocated for communications with the particular FAP for a specific UE. As described above, when a UE initially roves into the coverage area of the FAP, the initial service request will be the Location Update Request message. The Location Update Request message of the UE will contain identifiers (i.e., LAC) for the last LA visited by the UE.

Upon receiving the message, the process identifies (at 630) an IMSI associated with the UE initiating the service request. The process maps the IMSI to the particular FAP and TCP port from which the service request originated so that a response from the core network specifying the particular IMSI can be routed back to the proper FAP servicing the UE. Before forwarding the service request to a MSC/SGSN of the core network, the GANC appends (at 640) a Super LAC to the service request so that the core network will be able to route responses back to the GANC. In this manner, the Super LAC effectively replaces the Local LAC in routing communications and data to and from the core network as the core network only utilizes the Super LAC. As described above, the Super LAC of the GANC is distinct with respect to the other location areas serviced by a MSC/SGSN of the core network. Moreover, the Super LAC allows for message routing between the GANC and core network to occur transparently as the core network is unable to distinguish the GANC from its own RNCs or base transceiver stations (i.e., the GANC appears as another RNC to the core network).

The process forwards the service request with the appended Super LAC to the core network for processing. The process receives (at 650) a response from the core network. The process then identifies (at 660) the IMSI within the response and determines the particular FAP servicing the UE with the associated IMSI. The process maps the response to the particular TCP port associated with the FAP and IMSI and the response is forwarded (at 670) to the particular FAP.

Figure 7:
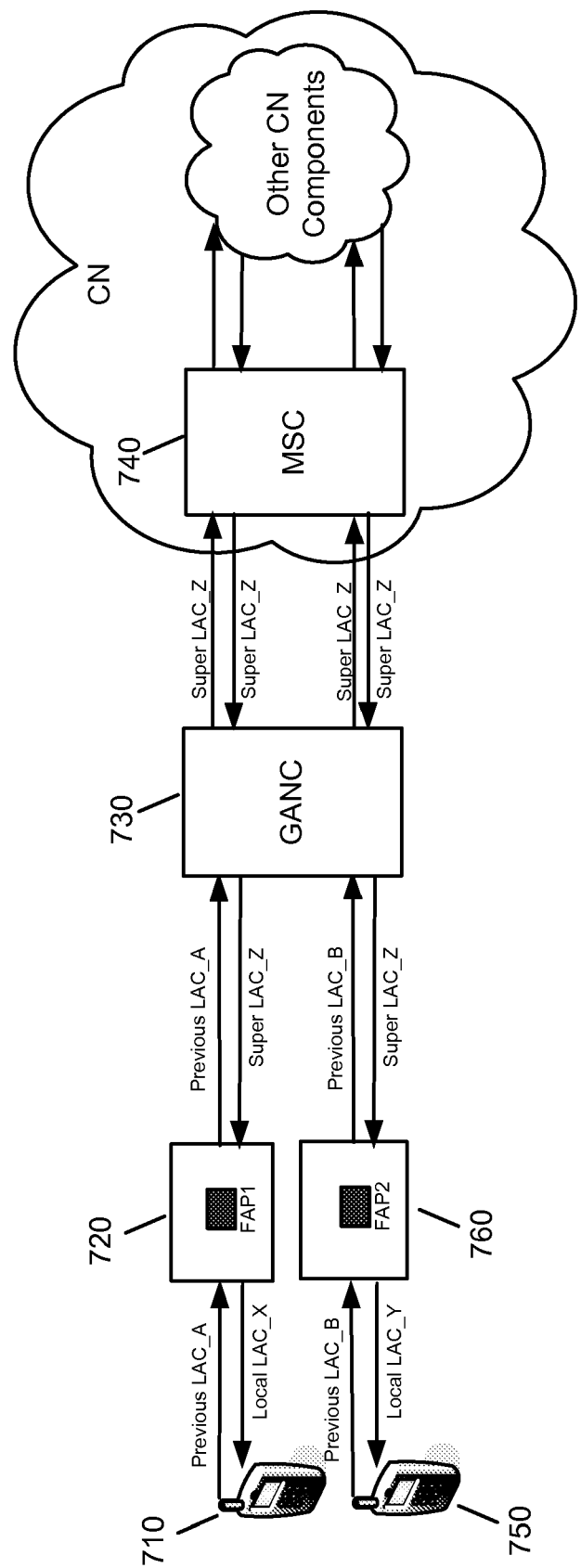
FIG. 7 illustrates the combined Local LAC to Super LAC conversion process of FIGS. 5 and 6.

FIG. 7 illustrates the combined Local LAC to Super LAC conversion process of FIGS. 5 and 6. Specifically, FIG. 7 illustrates the various identifiers used in communications with UEs 710 and 750, FAPs 720 and 760, a GANC 730, and a MSC 740 of a core network. In FIG. 7, the UE 710 camps on FAP 720. The FAP 720 advertises a Local LAC_X to the UE 710. The UE 710 detects the Local LAC_X and notices that it is now operating within a new location area. Therefore, the UE 710 initiates a Location Update Request which includes the LAI (i.e., MCC, MNC, and LAC) for the LA last visited by the UE 710. The FAP 720 forwards the message to the GANC 730 which appends a Super LAC_Z to the Location Update message before passing the message to components (i.e., MSC 740) of the core network. The core network responds with a Location Update Accept message that includes the Super LAC_Z used to identify and route the message back to the GANC 730 of the femtocell system.

The GANC 730 forwards the response with the Super LAC_Z to the FAP 720. The FAP 720 then performs a conversion from the Super LAC_Z to a Local LAC_X that was broadcast to the UE 710. The FAP 720 passes the Location Update Accept response back to the UE 710 using the Local LAC_X. The UE 710 receives the message and internally changes its location area to the Local LAC_X of the FAP 720. In this manner, the UE 710 and the core network seamlessly communicate with the femtocell system without requiring any changes to either the UE 710 or the components (i.e., MSC or SGSN) of the core network. For instance, the UE 710 operates in the same or similar manner as it does while operating only with the macro network as each FAP in the femtocell system appears as a distinct location area of the macro network. Similarly, the MSC of the core network operates in the same or similar manner as it does with a single RNC or other base transceiver station as all FAPs of the femtocell system that are serviced by a single GANC appear as a single location area of the core network.

To further illustrate the reuse of the Super LAC, a second UE 750 is shown in FIG. 7 connecting to a second FAP 760 that is serviced by the same GANC 730 servicing the FAP 720. The FAP 760 broadcasts a Local LAC_Y that is distinct from the Local LAC broadcast by FAP 720. The UE 750 upon receiving the Local LAC_Y, initiates a Location Update Request to notify the core network that it has entered into a new location area. As before, the FAP 760 passes the location update to the GANC 730 which appends the shared Super LAC_Z to the location update before passing the message to components (i.e., MSC 740) of the core network. The GANC 730 receives a Location Update Accept message with the Super LAC_Z from the core network. As described with reference to FIG. 6, the GANC 730 determines that the message is intended for the UE 750 by identifying the IMSI found within the message. The GANC 730 passes the message through the TCP port used by the FAP 760 servicing the UE 750. In some embodiments, the IMSI routing scheme permits the GANC 730 to identify the individual FAPs 720 and 760 that service the individual UEs 710 and 750 and further permits the GANC 730 to share a single Super LAC when communicating with the core network. The FAP 760 converts the Super LAC_Z to its own Local LAC_Y before forwarding the message to the UE 750. Therefore, as shown in FIG. 7, the core network believes that the service requests from UEs 710 and 750 both originate from the same LA even though the UEs 710 and 750 are operating on different FAPs 720 and 760 each with different allocated LACs.

Figure 8:
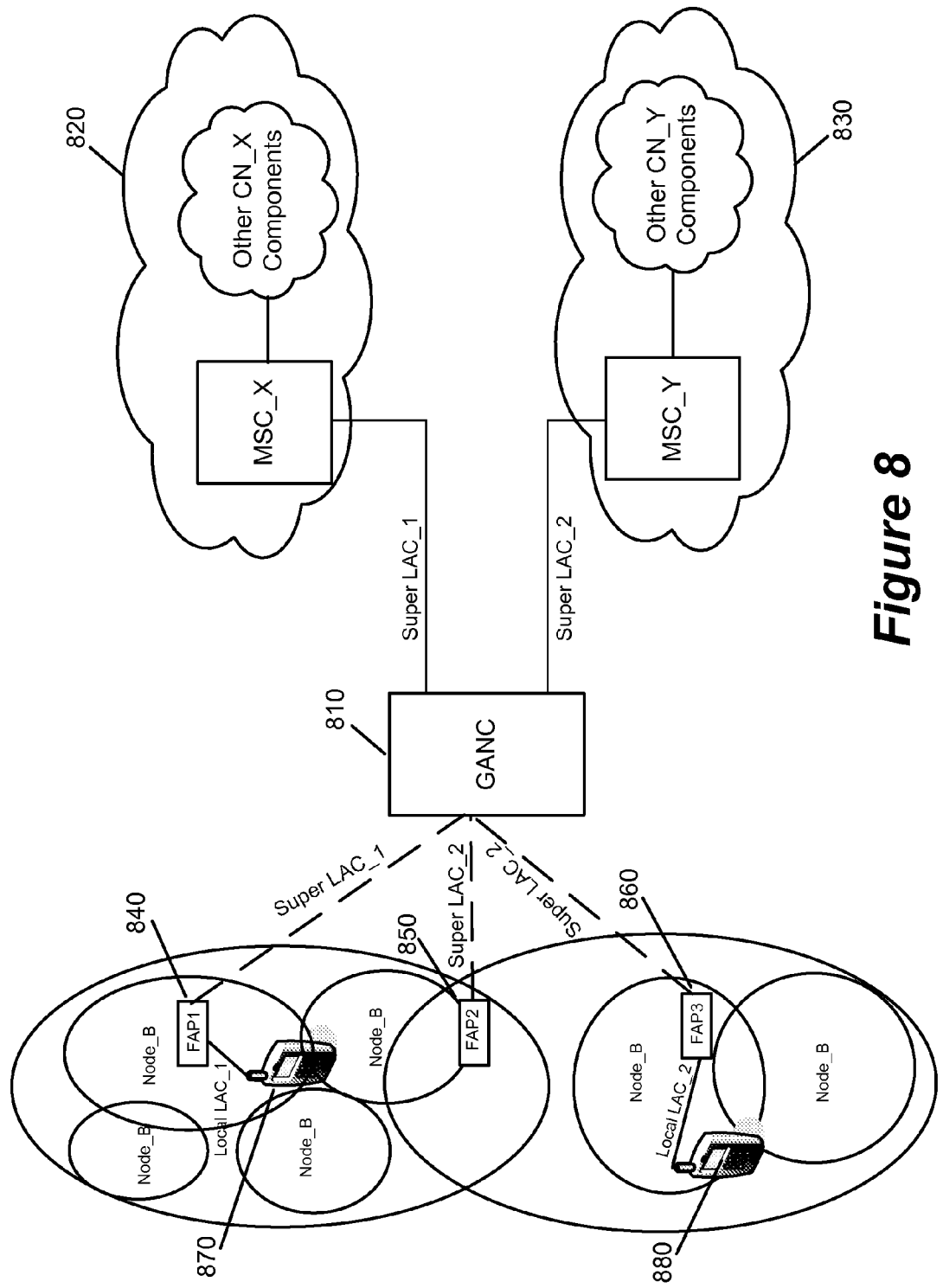
FIG. 8 illustrates subsequent message exchanges through the femtocell system between multiple UEs and multiple core networks after the UEs have successfully camped on FAPs of the femtocell system.

FIGS. 5-7 described the Local LAC to Super LAC conversion process upon the initial rove-in of a UE into a coverage area of a FAP. FIG. 8 illustrates subsequent message exchanges through the femtocell system between multiple UEs and multiple core networks after the UEs have successfully camped on FAPs of the femtocell system. Thus in FIG. 8, it is assumed that the UEs 870 and 880 have completed the location update procedure described above with reference to FIG. 7.

As shown in FIG. 8, a single GANC 810 of a femtocell system interfaces with two MSCs operating within two separate core networks 820 and 830. A distinct Super LAC is used in communications with the separate core networks 820 and 830. As such, the FAPs 840-860 serviced by the GANC 810 may be disbursed throughout the femtocell system to provide femtocell service via either core network 820 or 830.

A FAP 840 that provides access to the core network 820 through the femtocell system will have identified the Super LAC associated with the core network 820 during an initial FAP registration with the femtocell system or upon the initial rove-in of the UE triggering the location update procedure described with reference to FIG. 7. The FAP 840 utilizes the Super LAC assigned for communication with the core network 820 when performing the Super LAC to Local LAC conversion. Hence, the FAP 840 will replace the Local LAC found in subsequent messages received from the UE 870 with the Super LAC assigned for communications with the core network 820 before passing the messages to the GANC 810. Similarly, the FAP 840 will replace the Super LAC found in subsequent messages received from the core network 820 with the Local LAC before passing the messages to the UE 870.

A FAP 860 that provides access to the core network 830 through the femtocell system also will have identified the Super LAC associated with the core network 830. The FAP 860 utilizes the Super LAC assigned for communication with the core network 830 when performing the Super LAC to Local LAC conversion. As with the FAP 840, the FAP 860 will replace the Local LAC found in subsequent messages received from the UE 880 with the Super LAC assigned for communications with the core network 830 before passing the messages to the GANC 810. Similarly, the FAP 860 will replace the Super LAC found in subsequent messages received from the core network 830 with the Local LAC before passing the messages to the UE 880.

Since the GANC 810 is connected to both core networks, FAPs 840 and 860 have the option to configure or reconfigure for access to one or the other core network 820 or 830. By switching the Super LAC used by the FAPs in their LAC conversion, the FAPs can seamlessly transition and provide access to either core network. It should be recognized by one of ordinary skill in the art that such transition in some embodiments requires additional configuration steps. For instance, when transitioning from providing access to core network 820 to 830, a FAP may have to search for a new Local LAC that does not conflict with assigned LACs of the core network 830.

ii. Assignment of the Super LA/RA

Figure 9:
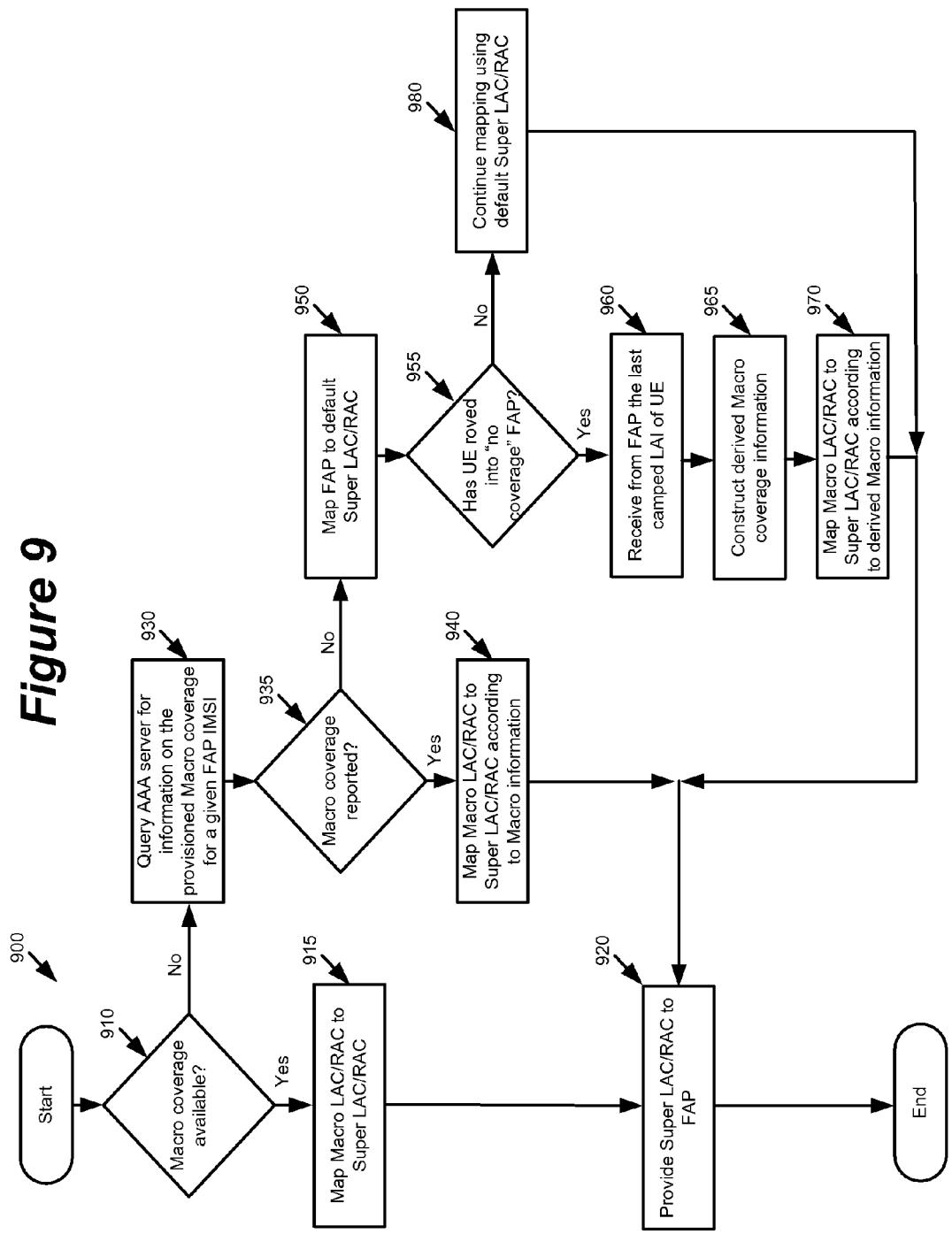
FIG. 9 presents a process that conceptually illustrates several operations performed by an INC of a GANC for performing the logical assignment of the Super LAC.

In some embodiments, the logical assignment of the Super LA/RA addressing for communications with the core network is performed by leveraging information provided by nearby macro networks. Some embodiments use such information to ensure that the Super LA/RA addressing (i.e., Super LAC/RAC) is unique. Additionally, some embodiments use such information to assign a Super LAC/RAC that can be used to optimally route traffic through the core network. FIG. 9 presents a process 900 that conceptually illustrates several operations performed by an INC of a GANC for performing the logical assignment of the Super LAC.

The process 900 begins when the INC receives (at 910) from a FAP a report as to whether macro coverage is available in the coverage area of the FAP. If macro coverage is available, the INC will map (at 915) the reported macro coverage information (i.e. macro LAI, macro 3G cell-id) to a Super LAI. In some embodiments, such mapping further permits multiple macro LAI/3G-CI to be mapped to the same Super LAI or different Super LAI based on required granularity of the service provider. The process then provides (at 920) the mapped Super LAI to the FAP for use when the FAP performs the translation between the Local LAC and Super LAC.

In some embodiments, the process 900 is also able to identify the serving MSC for the particular LA of the reported macro coverage area. In some embodiments, the MSC is identified by the FAP using information broadcast by the macro network or via UEs previously operating through the macro network, but that have roved-into the coverage of the FAP. The identified information is passed to the GANC in order to enable the GANC to forward service requests with the Super LAC to the particular MSC of the core network that services the nearest location area of the macro network. In this manner, routing is optimized as the service requests arrive at the closest available MSC, reducing latency and inter-MSC traffic, as only the minimum number of hops will be traversed when routing the service requests to their destination. Alternatively, the reported macro coverage can be used to identify the closest GANC for communications with the closest available MSC. For instance, during the initial FAP registration, the location of the FAP maybe unknown, therefore a default GANC can be assigned to service the FAP. However, the default GANC may be sub-optimally located for servicing the FAP (e.g., extraneous hops between the FAP and GANC). Therefore, upon the reported macro coverage, the femtocell system is able to identify the location of the FAP and redirect the FAP to be serviced by a closer and more optimally located GANC. In some such embodiments, the GANC's are preconfigured to operate in conjunction with the nearest MSC or SGSN, therefore by identifying the nearest GANC, the femtocell system automatically identifies the nearest MSC or SGSN.

However, if the FAP is unable to detect macro coverage, the process must include logic to either assign a default Super LAC. Such lack of knowledge of the neighbouring macro network and use of the default Super LAC assigned could result in sub-optimal routing as a GANC may forward service requests to more distant default MSCs of the core network. To arrive at the more distant MSCs, requires the service requests to traverse additional hops along the core network before reaching its destination. Such additional hop traversal creates delays in processing the service requests and further creates additional traffic on such hops that could otherwise be avoided through the optimized routing scheme described above. Other required services are also rendered unavailable. For instance, when the UE places an emergency services request, the MSC will be unable to route the emergency service request to the nearest MSC. As a result, the core network will be unable to determine the proper Public Safety Answering Point (PSAP) for responding to the emergency services request.

Therefore, some embodiments include additional logic for performing optimal routing to the macro network while assigning non-conflicting Super LACs for communications with components of the core network. To do so, the process queries (at 930) a AAA server via the S1 interface for information on the "provisioned macro coverage" for a given FAP IMSI. Information stored within the subscriber database is used to determine whether such provisioned macro coverage information is available. If the process determines (at 935) that information is available, then the process uses the information to map (at 940) the Super LAC and identify a nearby MSC for routing service requests into the core network as described above at 920.

However, if the process determines (at 935) that no information is available via the query into the AAA server at 930, then some embodiments map (at 950) a default Super LAC, but perform the additional steps 955-970 to prevent the sub-optimal routing resulting from the assignment of a default Super LAC. At 955, the process determines whether a UE has roved into the coverage area of the "no coverage" FAP. Without a UE roving in, the process continues to assign (at 980) the default LAC to map the FAP to a Super LAC. However, with a UE roving in, the FAP can gather information about neighboring macro networks from the messaging of the UE. For instance, the process receives (at 960) the last camped LAI of the UE from the initial IU request of the UE.

The process then uses the received information to construct (at 965) a "derived" macro coverage information. The derived macro coverage is reported by the FAP to the GANC in a "REGISTER UPDATE UPLINK" message. From the derived macro coverage information, the process determines (at 970) a mapping for the FAP to a Super LAC. The process reports (at 920) the assigned Super LAC to the FAP in a GA-RC Register Update Downlink message. Additionally, in some embodiments, the INC also reports a 3G Cell ID that contains a 12 bit RNC-id statically provisioned to each INC and a 16 bit dummy cell-id to be used by the FAP.

III. Femtocell Service Access Control

In conjunction with the mobility management functionality described above, some embodiments of the invention are able to provide a complete set of service access controls for the femtocell system. In some embodiments, service access controls are used to restrict access to the femtocell system by unauthorized UEs that are not authorized for femtocell service on that specific FAP. Additionally, in some embodiments, femtocell service access control encompasses the discovery, registration, and redirection functions as well as enhanced service access control functions, such as restricting femtocell service access based on the reported FAP MAC address or neighboring macro network UMTS cell information.

Some embodiments perform femtocell service access controls via (1) a local service access control performed by the FAP, (2) a basic service access control conducted by the FAP and INC, or (3) an enhanced service access control utilizing the S1 interface to distribute the service access control functionality to an AAA server. It should be apparent to one of ordinary skill in the art that some features from one access control approach or new features may be included within another service access control design approach while other features may be omitted from other service access control design approaches.

Figure 10:
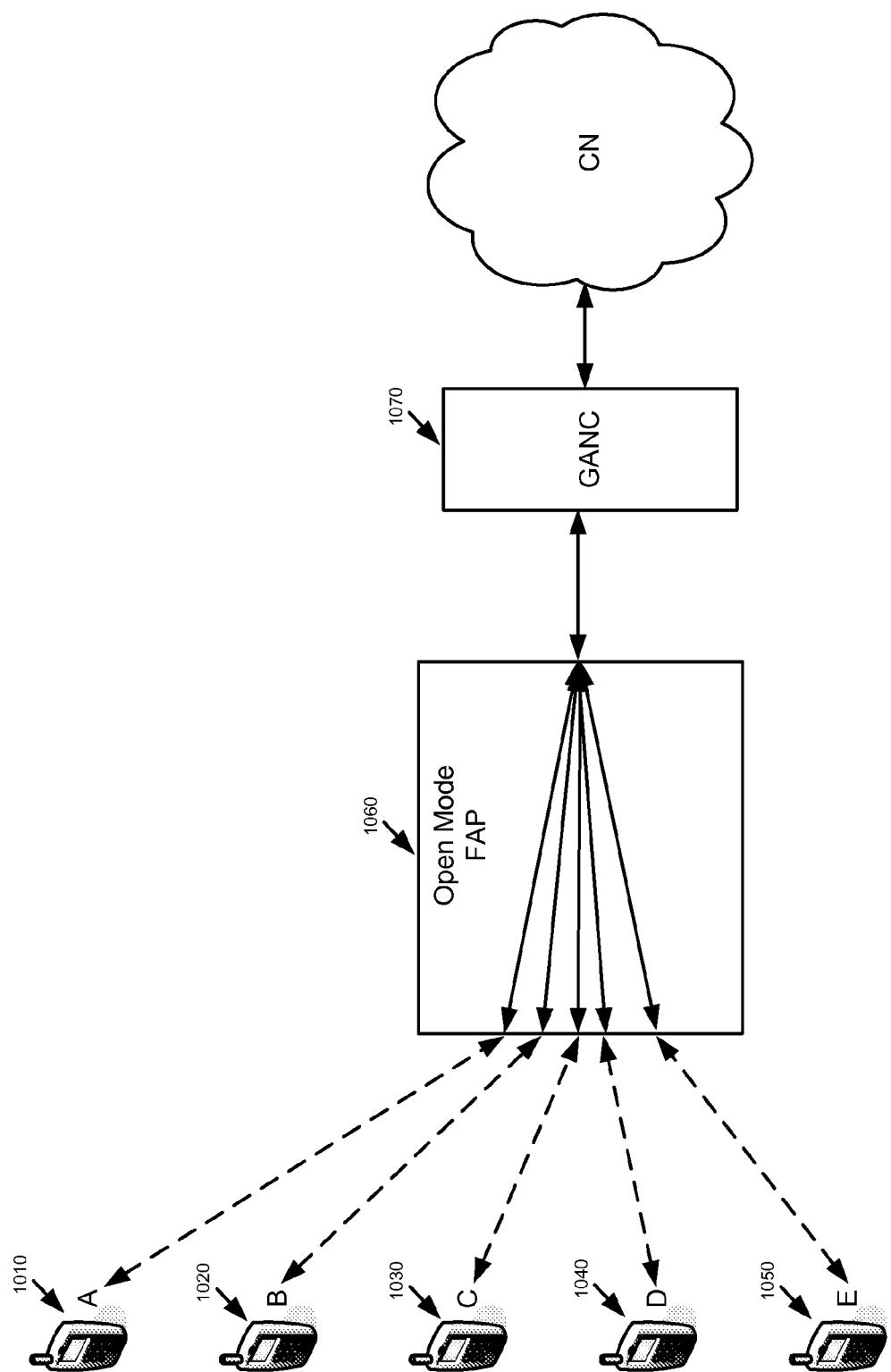
FIG. 10 illustrates an open access mode FAP in accordance with some embodiments of the invention.

In its most accessible state, a FAP operates in an open access mode where any UE may access the femtocell functionality through the particular FAP. FIG. 10 illustrates an open access mode FAP in accordance with some embodiments of the invention. In FIG. 10, a set of UEs 1010-1050 are within the coverage area of the FAP 1060. The UEs 1010-1050 camp on the FAP 1060 and utilize the FAP 1060 for service request exchanges with the ICS. Using some of the various location update messages described above and other registration messaging, the set of UEs 1010-1050 gain access to the core network by traversing the FAP and GANC of the femtocell system.

Figure 11:
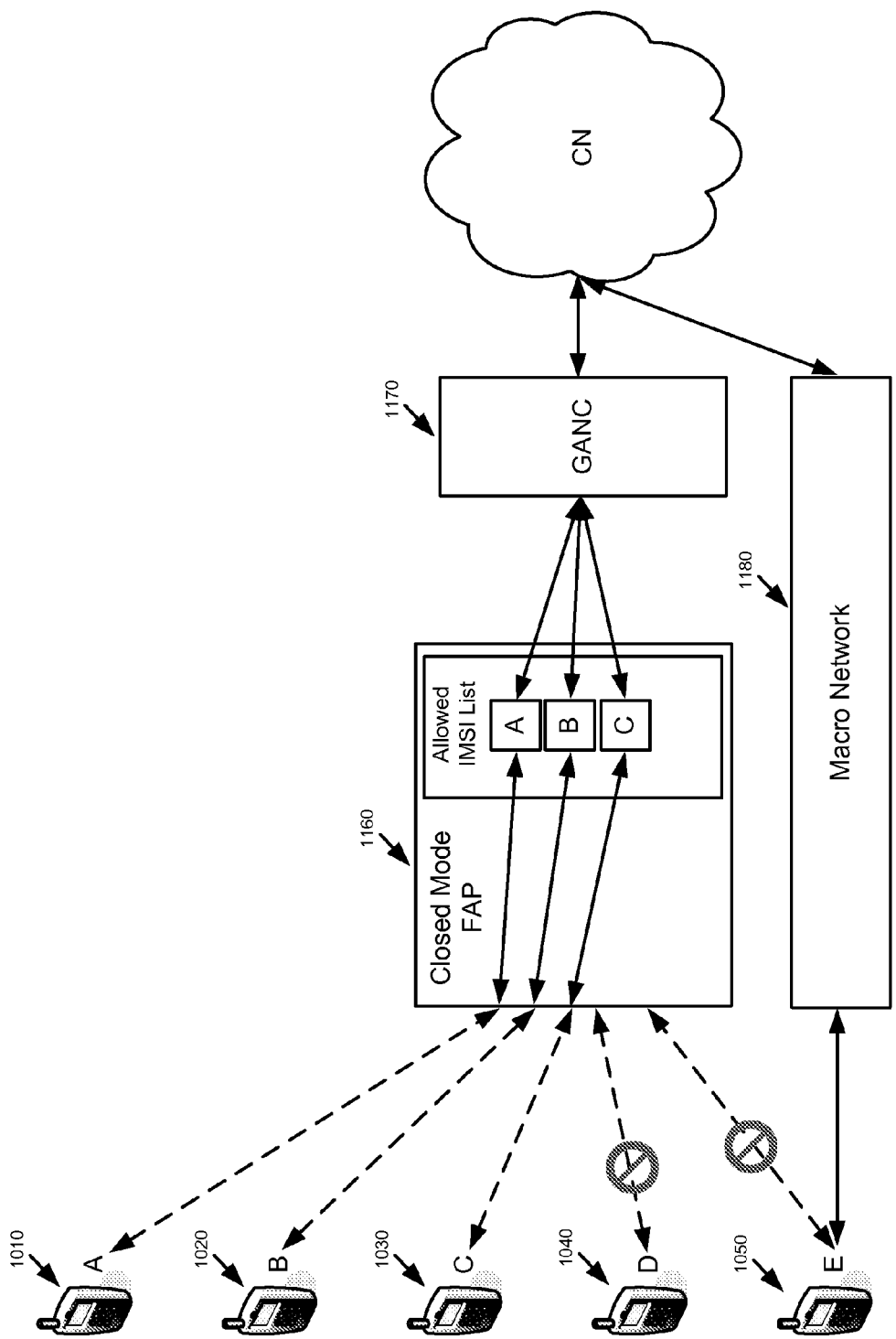
FIG. 11 illustrates a closed access mode FAP in accordance with some embodiments of the invention.

However, in some embodiments, the FAP restricts access to only those UEs that have subscribed to the femtocell service. Such FAPs are referred to as closed access mode FAPs. FIG. 11 illustrates a closed access mode FAP in accordance with some embodiments of the invention. In FIG. 11, the set of UEs 1010-1050 attempt to access the femtocell service though the FAP 1160. As part of its service access control, the FAP 1160 includes an allowed IMSI list for UEs that are authorized for or are permitted to access the femtocell service. In some embodiments, the allowed UE IMSI list is stored and maintained within a centrally managed AP/Subscriber database where it is accessible to various components of the femtocell system. For instance, some embodiments of the FAP 1160 access the allowed UE IMSI list stored in the AP/Subscriber database via an AMS. In other embodiments, the AAA server or INC via the AAA access the allowed UE IMSI list in order to perform network based service access control on behalf of the FAP.

The allowed IMSI list specifies that UEs 1010-1030 are subscribers and are permitted access with the specific FAP 1160. UEs 1040 and 1050 will be rejected as they are not authorized for service with the FAP 1160. However, it should be apparent to one of ordinary skill in the art that such UEs may be allowed access to certain other FAPs, such as a FAP located within the UE's home location. Therefore, the rejection causes the UEs 1040 and 1050 to locate service via alternative means. In FIG. 11, the UE 1050 is able to receive service by connecting to the macro network 1180. However, the UE 1040 may not be a subscriber to either the femtocell service or the particular macro network 1180 and therefore UE 1040 is unable to receive service.

Some embodiments include additional operating access modes for the FAPs. For instance, in some embodiments, the FAPs operate in a semi-open or semi-closed access mode whereby unauthorized UEs are able to receive incoming service requests though they are restricted from making outgoing service requests. It should be apparent to one of ordinary skill in the art that the service provider may allow for a variety of different services through the semi-open or semi-closed operating access modes.

Figure 12:
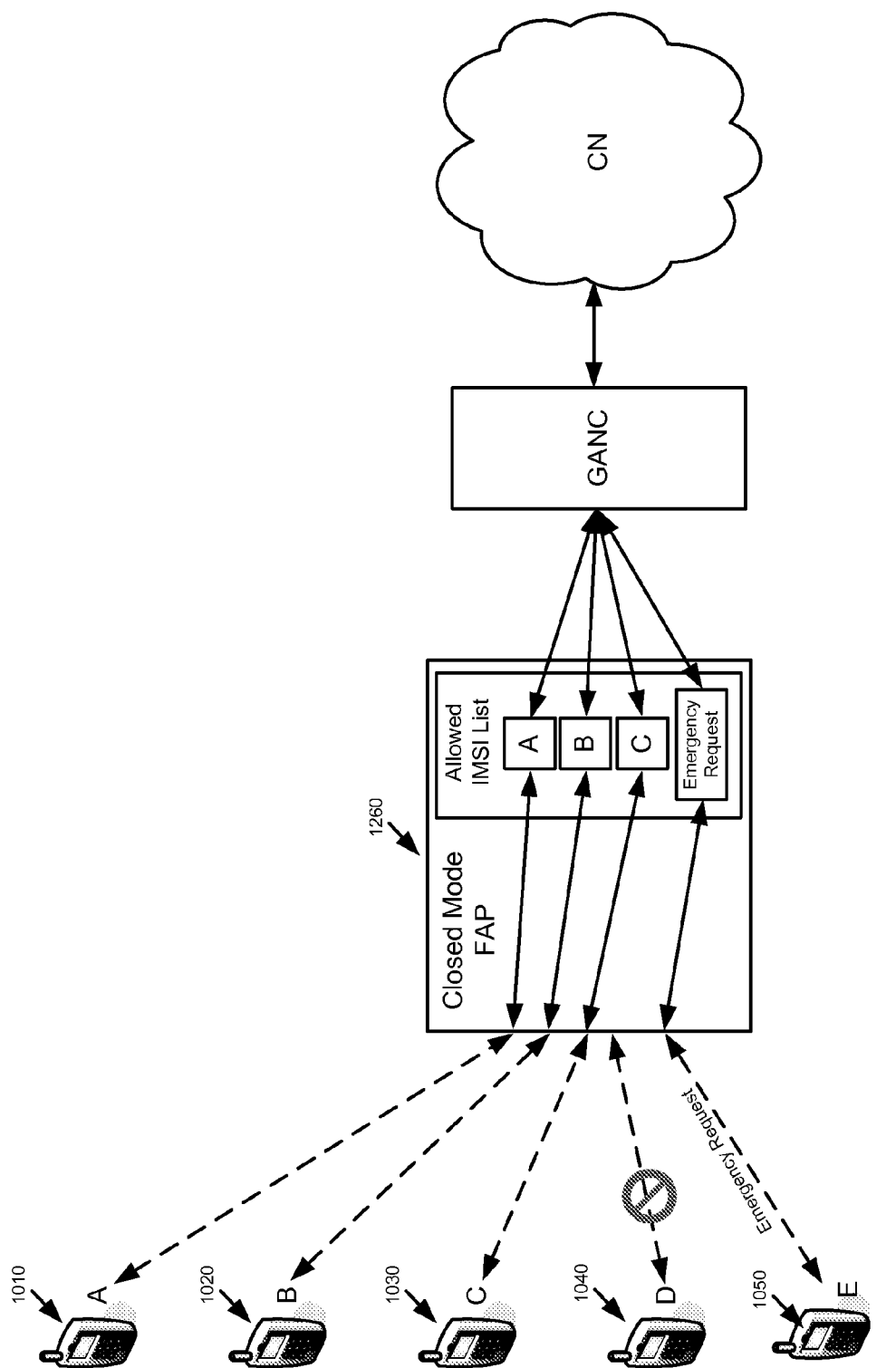
FIG. 12 illustrates a closed access mode FAP that permits access to an unauthorized user attempting to establish an emergency service request.

In addition to service provider specified requirements, some embodiments of the femtocell service must provide certain minimal functionality irrespective of whether the UE is a subscriber to the femtocell service. One such requirement is to allow any UE the ability to place an emergency service request when within the coverage area of the FAP. FIG. 12 illustrates a closed access mode FAP that permits access to an unauthorized user attempting to establish an emergency service request.

In FIG. 12, UEs 1040 and 1050 are not within the allowed IMSI list of the FAP 1260. Therefore, the FAP 1260 issues a rejection to the UE 1040. However, the FAP 1260 allows access to the UE 1050, because the UE 1050 is attempting to place an emergency services request. In some embodiments, the emergency service request is indicated through the establishment cause field of an RRC message. RRC messaging is described within the 3GPP TS 25.331 document titled "Radio Resource Control (RRC) protocol specification". Some embodiments therefore provide various UE rejection mechanisms that account for allowing an emergency services request to be placed via the FAP in the absence of macro coverage. However, it should be apparent to one of ordinary skill in the art that various other requirements other than providing service for an emergency services request may be required as part of the service access control of the FAP.

Additionally, some embodiments provide various UE rejection mechanisms to ensure that UE rejection on one FAP does not affect the UE's service on any other authorized FAP. As described above, part of the femtocell mobility management requires each FAP to be assigned a LAC/RAC. As part of the LAC/RAC assignment requirement, no neighboring FAPs or cells of the macro network should have the same LAC/RAC. However, it is possible that two non-neighboring FAPs or a non-neighboring cell of a macro network and a FAP share the same LAC. Therefore, when a UE attempts to access service through an unauthorized FAP or cell, the UE will be rejected and the UE will store the LAC/RAC of the rejected FAP within a barred list of LACs/RACs on the SIM. The UE will not attempt to access any LACs/RACs in the barred list should it come within a coverage area specifying those identifiers. The UE can return to an authorized FAP in which it should be permitted access to, but because a different non-neighboring FAP or cell contained a similar LAC/RAC that was barred, the UE will not attempt to access such a FAP. Therefore, the UE rejection mechanism of some embodiments contains safeguards to ensure that valid LAC/RAC identifiers are not improperly barred.

Figure 13:
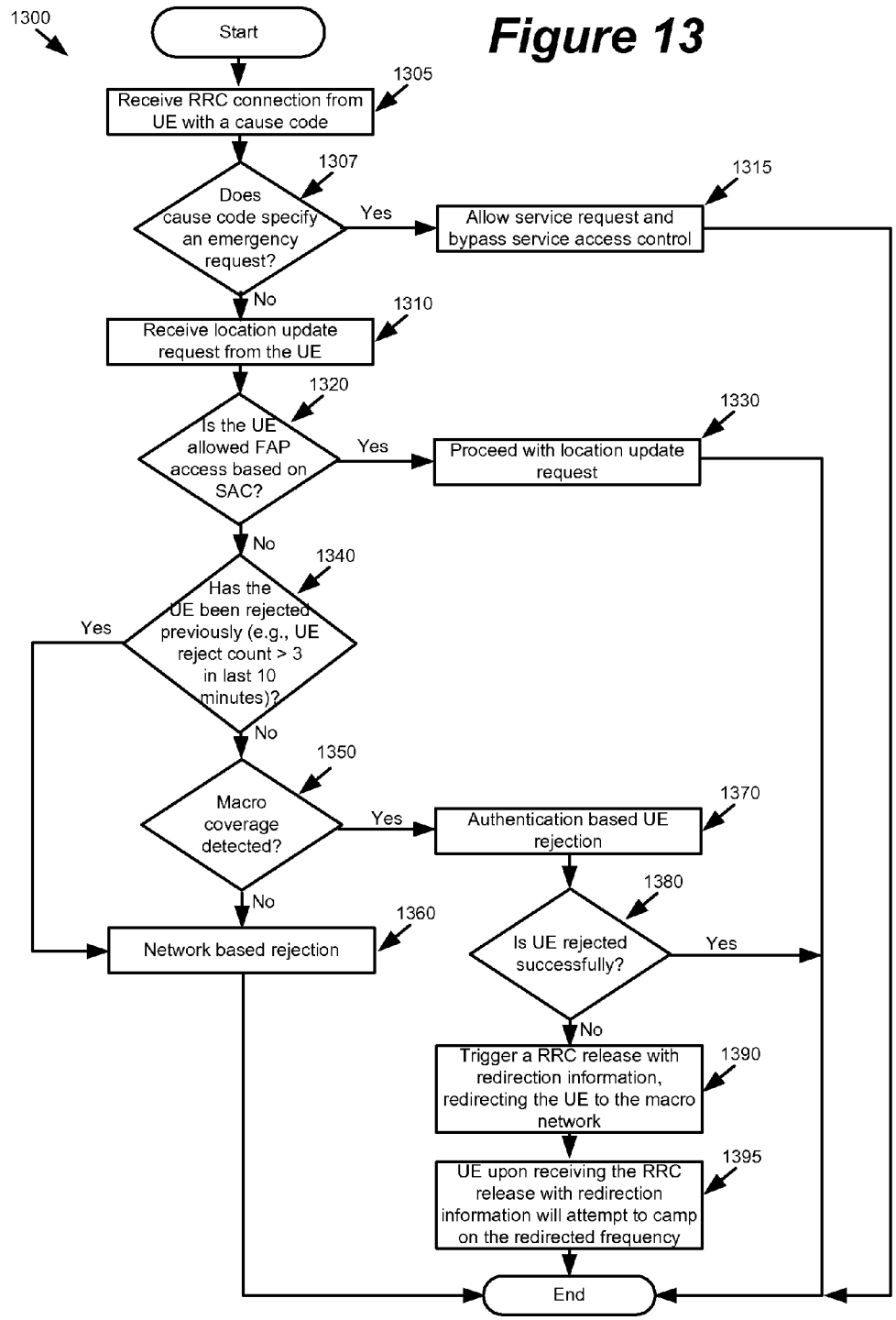
FIG. 13 presents a process that conceptually illustrates several operations performed for rejection of an unauthorized UE while ensuring such rejection does not affect the UE's service on any other authorized FAP.

FIG. 13 presents a process 1300 that conceptually illustrates several operations performed for rejection of an unauthorized UE while ensuring such rejection does not affect the UE's service on any other authorized FAP. In some embodiments, the process 1300 is entirely performed by a FAP of the femtocell system, while in other embodiments the FAP in conjunction with a GANC or AAA server perform the process of FIG. 13. The process 1300 begins when a UE enters the coverage area of a FAP and initiates (at 1305) an RRC connection specifying a cause code. The process determines (at 1307) whether the specified cause code specifies an emergency services request. If the cause code specifies an emergency service request, the process will permit (at 1315) the UE to access the femtocell system in order to establish the emergency service request irrespective of whether the UE is authorized to access the system. In such instances, service access control procedures are bypassed. It should be apparent to one of ordinary skill in the art that should the process determine that the UE is unauthorized for access and further determine the availability of macro system coverage, then in some such instances, the process 1300 performs a rejection of the UE so that the emergency service request is established over the core network. Additionally, some embodiments of the process 1300 permit access to the femtocell system based on specified cause codes other than emergency service requests irrespective of whether the UE is authorized for access.

If the process determines that the cause code does not specify (at 1307) an emergency service request, then the process awaits for the UE to initiate (at 1310) a service request message such as a location update message to the FAP. Upon receiving the initial service request message, the process determines (at 1320) if the UE is allowed access to the FAP by searching the service access control of the FAP. In some embodiments, the determination at 1320 is based on whether the UE IMSI is within the allowed list of UE IMSIs. However, as was discussed above, some embodiments provide network based service access control in which the UE IMSI authentication occurs in conjunction with a AAA server or INC of the femtocell system.

If the process determines (at 1320) that the UE is authorized for access, then the UE is allowed to proceed (at 1330) with the location update request and the UE may register and utilize the services provided by the FAP and the femtocell system. However, if the process determines (at 1320) that the UE is unauthorized for access based on the service access control of the FAP, then the process determines (at 1340) whether the UE has already been rejected a specified number of times. In some embodiments, the determination at 1340 is used to determine what type of rejection is appropriate for the UE. Additionally, the process includes a determination (at 1350) to identify whether macro coverage is available. In some instances, a more permanent rejection is required to prevent the UE from continually attempting to re-access the FAP. Such a rejection is appropriate to prevent the continual passing of the UE from one network back to the femtocell system and vice versa (i.e., if macro coverage is available). In other instances, a more temporary rejection of the UE is adequate. For example, if UE momentarily passes through the coverage area of the FAP, then a temporary rejection is sufficient to cause the UE to attempt alternative access points or networks for service without having the UE return and continually request service from the particular FAP of the femtocell system.

If the UE has reached the threshold amount of allowed rejections, the process will perform (at 1360) a network based rejection (i.e., the more permanent rejection) to prevent further access attempts by the UE. The network based rejection is described in further detail with reference to FIG. 14 below. If the UE has not reached the threshold amount of allowed rejections, the process performs (at 1370) an authentication based UE rejection. The process then determines (at 1380) whether the authentication based UE rejection was successful. If successful, the process ends and the UE does not attempt to reconnect to the FAP. However, an unsuccessful authentication based UE rejection may indicate that an additional or alternative form of rejection may be required. In some embodiments, the alternative form of rejection is required as some UEs do not properly respond to the authentication based UE rejection, since the authentication based UE rejection requires a two way authentication to occur between the UE and the FAP. UEs that contain a 2G SIM only perform a one way communication and therefore the authentication based UE rejection would be unsuccessful when applied to a 2G SIM bearing UE. The authentication based UE rejection is described in further detail with reference to FIG. 15 below.

In FIG. 13, the process 1300 also includes the operations 1390 and 1395 to perform the alternative type of UE rejection for UEs with the 2G SIM (i.e., no Universal SIM (USIM) present). At 1390, the process triggers a "RRC CONNECTION RELEASE" message with redirection information (REL-6) to redirect the UE to an identified macro network. Alternatively, at 1390, the process may issue a "RRC CONNECTION RELEASE" message followed by a "RRC CONNECTION REJECT" message with redirection information to redirect the unauthorized UE to the macro cell. The UE receiving the release message will then attempt (at 1395) to camp on a suitable cell in the redirected frequency. In some embodiments, the redirected frequency is frequency different than the frequency used to in passing data to and from the femtocell system. However, should the process be unable to locate a suitable macro network by which to redirect the UE, the process alternatively releases the RRC connection and subsequently rejects the UE within a maximum wait time.

It should be apparent to one of ordinary skill in the art that the redirection of the UE may not be successful due to certain biasing parameters advertised by the FAP or the unavailability of the redirect macro network which could cause the UE to reconnect to the FAP. In such instances, the determination at 1340 permits a specified number of reconnection attempts before the more permanent network based rejection at 1360 is performed.

Figure 14:
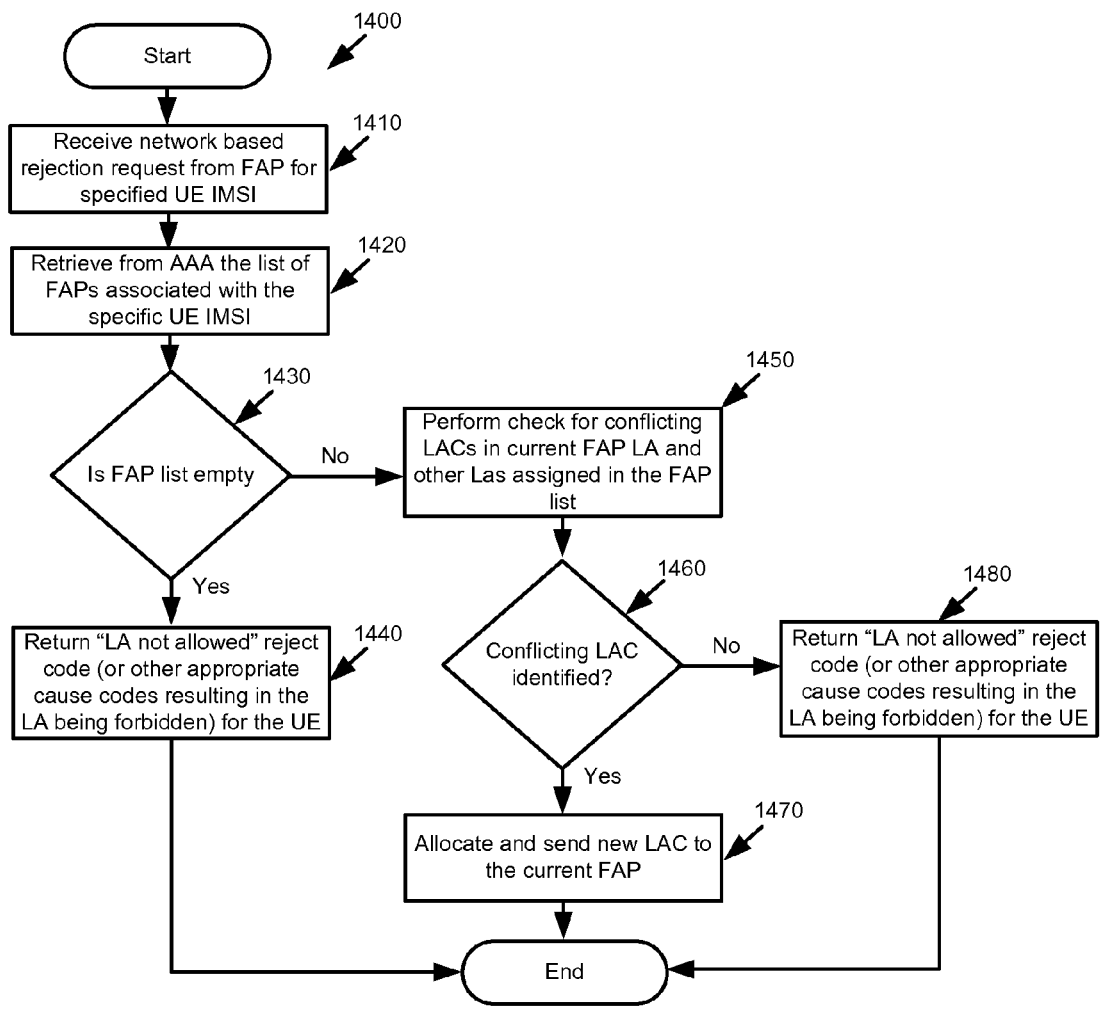
FIG. 14 presents a process that conceptually illustrates several operations performed by the GANC to reject an unauthorized UE and prevent the UE from future attempts to reconnect to the particular FAP.

FIG. 14 presents a process 1400 that conceptually illustrates several operations performed by the GANC to reject an unauthorized UE and prevent the UE from future attempts to reconnect to the particular FAP. The process 1400 begins when a GANC receives (at 1410) from the FAP a request for a network based rejection for a specified UE IMSI. The process then retrieves (at 1420) from a AAA server a list of FAPs associated with the specific UE IMSI. In some embodiments, the retrieved list specifies the FAPs through which the UE is authorized to receive service.

If the process determines (at 1430) that the retrieved FAP list is empty, then it is assumed that the UE is not a subscriber of the particular femtocell service provider. Therefore at 1440, the process returns a location area not allowed reject code via a "LOCATION UPDATING REJECT" message to the UE. It should be apparent to one of ordinary skill in the art that the reject code of some embodiments specifies some other appropriate cause code that results in the LA being forbidden. Upon receiving the LA not allowed reject code, the UE will store the LAC associated with the FAP in a barred list within its SIM and the UE will attempt to camp on a different cell within a different LA. Since the LAC of the FAP is now within the UE's barred list of LAs, the UE will not attempt future connections with the FAP so long as the FAP is assigned the barred LAC and the UE is not power cycled. If the UE is within the coverage area of a macro network, then it is likely that the UE will locate and connect through a location area of the macro network.

However, if the process determines (at 1430) that the retrieved FAP list is not empty, then the process performs additional checks to ensure that issuing a LA not allowed rejection code will not bar the UE from access to other FAPs in which the UE is authorized to access. Therefore, the process performs a check (at 1450) to determine whether any of the FAPs on which the UE is authorized for access are not assigned the same LAC as the particular FAP that is attempting to reject the UE. If the process does not identify (at 1460) any conflicts, then it is safe to issue (at 1480) the LA not allowed rejection code or some other appropriate cause code that results in the LA being forbidden. Upon receiving the LA not allowed rejection code, the UE will store the LAC associated with the LA within its barred list and the UE will cease any subsequent attempts to reconnect to any particular FAPs with the barred LAC. If the process identifies (at 1460) conflicting LACs or the process is unable to retrieve the FAP list, then the process allocates (at 1470) a new non-conflicting LAC to the FAP in which the UE is not authorized for access. In this manner, the UE can return to any other FAP on which it is authorized for access and still gain access on such FAPs.

In some embodiments, the newly assigned non-conflicting LAC is assigned from a reserved pool of LACs reserved for such conflicts. The reassigned FAP receives the newly assigned LAC through a modified "system information" carried in the GA-RC REGISTER UPDATE DOWNLINK message. The newly assigned LAC remains valid for a fixed time period, after which time the FAP will be reassigned either its original LAC or a different LAC from a pool of available LACs.

While the rejection mechanism specified within the process 1400 has been described with respect to LACs. It should be apparent to one of ordinary skill in the art that some embodiments perform a similar form of UE rejection when unauthorized RAI (since the LAC is part of the LAI which is part of the RAI) are used to access the femtocell system through the FAP.

Figure 15:
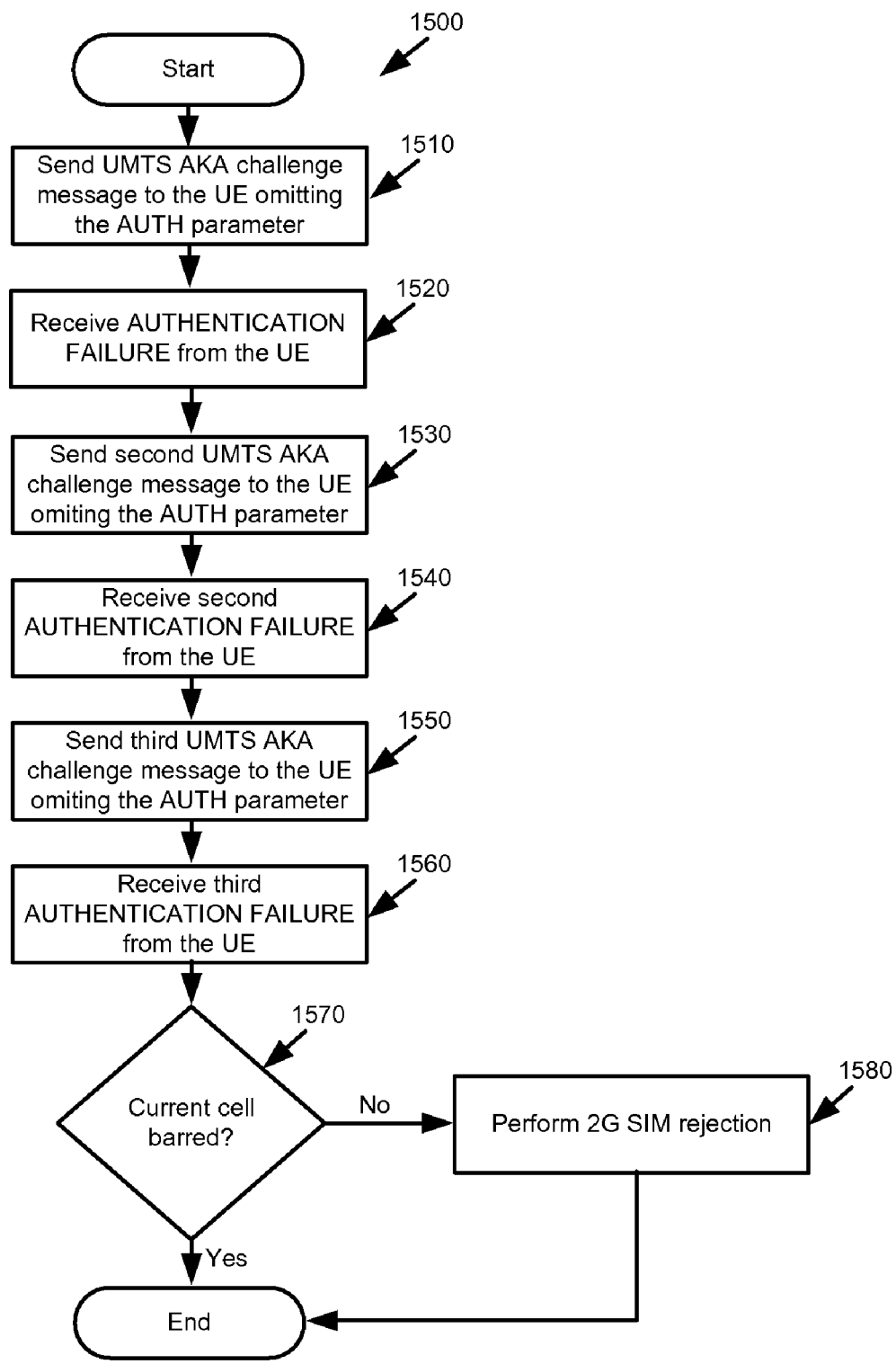
FIG. 15 presents a process that conceptually illustrates several operations performed by the GANC to reject an unauthorized UE using an authentication based UE rejection.

As described at 1350 and 1370 of FIG. 13, some embodiments can perform UE rejection without having to bar the LAC associated with the rejection FAP. In some such embodiments, an authentication based UE rejection is used. FIG. 15 presents a process 1500 that conceptually illustrates several operations performed by the FAP to reject an unauthorized UE using an authentication based UE rejection. The process 1500 begins by sending (at 1510) a UMTS AKA challenge message to the UE, such as an "AUTHENTICATION REQUEST". However, the message will omit the AUTN parameter. The UE to be rejected will receive the challenge message and will identify the missing AUTN parameter. In response, the UE will issue an "AUTHENTICATION FAILURE" message which is received (at 1520) by the process 1500. The process sends (at 1530) a second similar UMTS AKA challenge message to the UE. As before, the process will receive (at 1540) an "AUTHENTICATION FAILURE" message from the UE due to the omitted AUTN parameter. A third such exchange occurs (at 1550 and 1560).

When the UE receives and responds to the failed third "AUTHENTICATION REQUEST", the mobility management layer of the UE will bar the current cell and release the RRC connection with the FAP. Furthermore, the UE performs a cell reselection and will attempt to camp on a cell of the macro network. It should be apparent to one of ordinary skill in the art that the mobility management layer of different UEs may require fewer or less invalid "AUTHENTICATION REQUEST" messages. Additionally, if the UE contains a 2G SIM, then the UE will not respond to the invalid "AUTHENTICATION REQUEST" with an "AUTHENTICATION FAILURE" message and such a rejection mechanism will not work. Therefore, the process verifies (at 1570) whether the UE has barred the FAP cell. If not, then the process determines that the UE contains a 2G SIM and performs (at 1580) the UE rejection as described with reference to 1390 and 1395 of FIG. 13.

IV. Computer System

Figure 16:
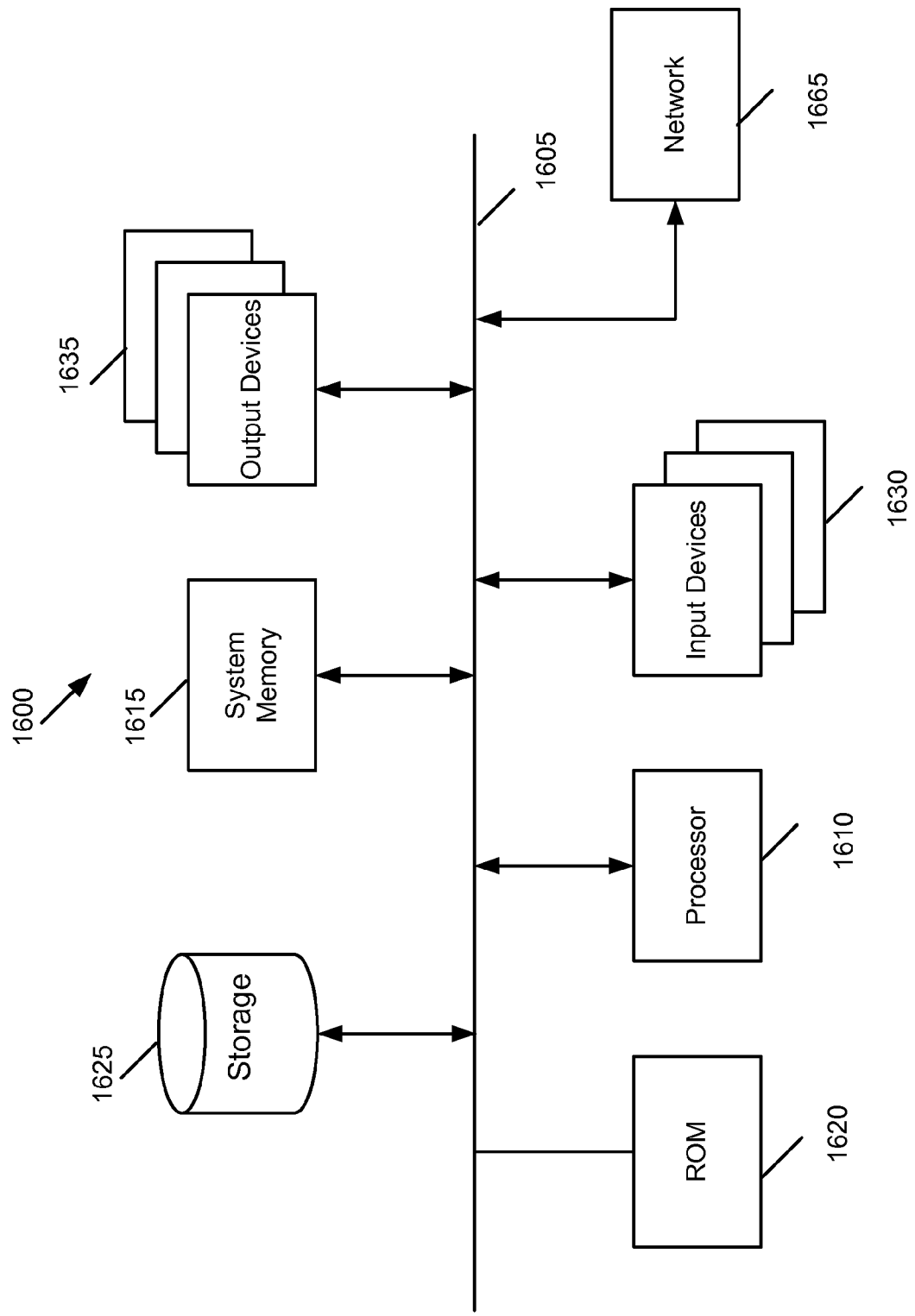
FIG. 16 conceptually illustrates a computer system with which some embodiments are implemented.

FIG. 16 conceptually illustrates a computer system with which some embodiments of the invention are implemented. The computer system 1600 includes a bus 1605, a processor 1610, a system memory 1615, a read-only memory 1620, a permanent storage device 1625, input devices 1630, and output devices 1635.

The bus 1605 collectively represents all system, peripheral, and chipset buses that support communication among internal devices of the computer system 1600. For instance, the bus 1605 communicatively connects the processor 1610 with the read-only memory 1620, the system memory 1615, and the permanent storage device 1625.

From these various memory units, the processor 1610 retrieves instructions to execute and data to process in order to execute the processes of the invention. In some embodiments the processor comprises a Field Programmable Gate Array (FPGA), an ASIC, or various other electronic components for executing instructions. The read-only-memory (ROM) 1620 stores static data and instructions that are needed by the processor 1610 and other modules of the computer system. The permanent storage device 1625, on the other hand, is a read-and-write memory device. This device is a non-volatile memory unit that stores instruction and data even when the computer system 1600 is off. Some embodiments of the invention use a mass-storage device (such as a magnetic or optical disk and its corresponding disk drive) as the permanent storage device 1625. Some embodiments use one or more removable storage devices (flash memory card or memory stick) as the permanent storage device.

Like the permanent storage device 1625, the system memory 1615 is a read-and-write memory device. However, unlike storage device 1625, the system memory is a volatile read-and-write memory, such as a random access memory. The system memory stores some of the instructions and data that the processor needs at runtime.

Instructions and/or data needed to perform processes of some embodiments are stored in the system memory 1615, the permanent storage device 1625, the read-only memory 1620, or any combination of the three. For example, the various memory units contain instructions for processing multimedia items in accordance with some embodiments. From these various memory units, the processor 1610 retrieves instructions to execute and data to process in order to execute the processes of some embodiments.

The bus 1605 also connects to the input and output devices 1630 and 1635. The input devices enable the user to communicate information and select commands to the computer system. The input devices 1630 include alphanumeric keyboards and cursor-controllers. The output devices 1635 display images generated by the computer system. The output devices include printers and display devices, such as cathode ray tubes (CRT) or liquid crystal displays (LCD). Finally, as shown in FIG. 16, bus 1605 also couples computer 1600 to a network 1665 through a network adapter (not shown). In this manner, the computer can be a part of a network of computers (such as a local area network ("LAN"), a wide area network ("WAN"), or an Intranet) or a network of networks (such as the Internet).

It should be recognized by one of ordinary skill in the art that any or all of the components of computer system 1600 may be used in conjunction with the invention. For instance, some or all components of the computer system described with regards to FIG. 16 comprise some embodiments of the UE, FAP, GANC, and GGSN described above. Moreover, one of ordinary skill in the art will appreciate that any other system configuration may also be used in conjunction with the invention or components of the invention.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. Moreover, while the invention has been described with reference to numerous specific details, one of ordinary skill in the art will recognize that the invention can be embodied in other specific forms without departing from the spirit of the invention.

In some examples and diagrams, two components may be described or shown as connected to each other. The connection may be a direct wire connection or the two components may be communicatively coupled to each other through other components or through wireless or broadband links. Thus, one of ordinary skill in the art would understand that the invention is not to be limited by the foregoing illustrative details, but rather is to be defined by the appended claims.

APPENDIX I—ABBREVIATIONS

AAA Authorization, Authentication, and Accounting
AMS FAP Management System
AP Access Point
ASIC Application Specific Integrated Circuit
ATM Asynchronous Transfer Mode
BSC Base Station Controller
BSS Base Station Subsystem
BTS Base Transceiver Station
CBC Cell Broadcast Center
CGI Cell Global Identification
CI Cell Identifier
CMTS Cable Modem Termination Services
CN Core Network
CS Circuit Switched
DB Database
DSL Digital Subscriber Line
DSLAM Digital Subscriber Line Access Multiplexer
EAP Extensible Authentication protocol
EDGE Enhanced Data Rates for GSM Evolution
FAP Femtocell Access Point
GAN Generic Access Network
GANC GAN Network Controller
GERAN GSM EDGE Radio Access Network
GGSN Gateway GPRS Support Node
GMLC Gateway Mobile Location Center
GMM/SM GPRS Mobility Management and Session Management
GPRS General Packet Radio Service
GSM Global System for Mobile communications
HPLMN Home PLMN
HLR Home Location Register
ICS Integrated Communication System
IMSI International Mobile Subscriber Identity
INC IP Network Controller
IP Internet Protocol
IPSec IP Security
ISDN Integrated Services Digital Network
ISP Internet Service Provider
LA Location Area
LAC Location Area Code
LAI Location Area Identifier
IU Location Update
MAC Medium Access Control or Message Authentication Code (same as MIC)
MCC Mobile Country Code
MG or MGW Media Gateway
MM Mobility Management
MN Macro Network
MNC Mobile Network Code
MS Mobile Station
MSC Mobile Switching Center
NAT Network Address Translation
PCS Personal Communications Services
PLD Programmable Logic Device
PLMN Public Land Mobile Network
POTS Plain Old Telephone Service
PS Packet Switched
PSAP Public Safety Answering Point
PSTN Public Switched Telephone Network
RA Routing Area
RAC Routing Area Code
RAI Routing Area Identity
RAM Random Access Memory
RNC Radio Network Controller
ROM Read Only Memory
RRC Radio Resource Control
SAC Service Area Code
SAI Service Area Identifier
SEGW GANC Security Gateway
SGSN Serving GPRS Support Node
SIM Subscriber Identity Module
SIP Session Initiation Protocol
SMLC Serving Mobile Location Center
SMS Short Message Service
SSID Service Set Identifier (also known as "Network Name")
TCP Transmission Control Protocol
UE User Equipment
UMTS Universal Mobile Telecommunication System
UNC Universal Network Controller
UTRAN UMTS Terrestrial Radio Access Network
VLR Visited Location Register
WLAN Wireless Local Area Network

What is claimed is:

1. For a communication system comprising (i) a first communication network comprising a plurality of access areas and a core network and (ii) a second communication network comprising a plurality of access areas and a network controller for communicatively coupling the plurality of second communication network access areas to the core network, a method comprising:

at the network controller, receiving a message from a user equipment (UE) through an access point of a particular access area of the second communication network, the message comprising a first area identifier for identifying an access area of the communication system last visited by the UE;

at the network controller, adding a second area identifier to the message, wherein the second area identifier is for identifying the plurality of second communication network access areas as a single access area to the core network;

from the network controller, sending the message comprising the second area identifier to the core network before communicatively coupling said UE to the core network;

at the network controller, receiving a response to the message from the core network, the response comprising the second area identifier; and from the network controller, passing the response comprising the second area identifier to the access point of the particular access area, the access point communicatively coupling said UE to the network controller and replacing the second area identifier in the response with a third area identifier identifying the particular access area of the access point before sending the response to the UE.

2. The method of claim 1, wherein the second area identifier is used by the core network to send messages to and from the network controller.

3. The method of claim 2, wherein the first area identifier comprises location area codes (LACs) for location areas of a UMTS or GSM network.

4. The method of claim 1, wherein the first area identifier identifies an access area of the first communication network last visited by the UE.

5. For a communication system comprising (i) a first communication network comprising a plurality of access areas and a core network and (ii) a second communication network comprising a plurality of access points for establishing a plurality of access areas of the second communication network and a network controller for communicatively coupling the plurality of access areas of the second communication network to the core network, a method comprising:
at a particular access point, receiving a message from a user equipment (UE) in a second communication network access area associated with the particular access point, the message comprising a first area identifier for identifying an access area of the first communication network;
at the particular access point, adding a second area identifier to the message;
passing the message comprising the second area identifier from the particular access point to the core network through the network controller;
at the particular access point, receiving a response to the message from the core network through the network controller, the response comprising the second area identifier;
at the particular access point, replacing the second area identifier in the response with a third area identifier identifying the second communication network access area associated with the particular access point; and
transmitting the response comprising the third area identifier from the particular access point to the UE.

6. The method of claim 5, wherein the first, second, and third area identifiers comprise location area codes (LACs) for location areas of a UMTS or GSM network, wherein the third area identifier is unique to area identifiers associated with other neighboring access areas of the communication system and is reusable to identify access areas that do not neighbor the access area associated with the particular access point.

7. The method of claim 5, wherein the response is sent from the network controller to the particular access point based on an international mobile subscriber identity (IMSI) associated with the UE.

8. The method of claim 5, wherein the second area identifier is for identifying the plurality of second communication network access areas as a single access area to the core network.

9. The method of claim 5, wherein the second area identifier is received at the particular access point during a registration of the access point with the network controller.

10. In a communication system comprising (i) a first communication network comprising a plurality of access areas and a core network and (ii) a second communication network comprising a plurality of access areas and a network controller for communicatively coupling the plurality of second communication network access areas to the core network, a non-transitory computer readable medium storing a computer program for execution by at least one processor, the computer program comprising sets of instructions for:
determining a first area identifier for the second communication network based on a set of area identifiers associated with a set of first communication network access areas, wherein the first area identifier is for identifying the plurality of second communication network access areas as a single access area to the core network;
receiving a message from a user equipment (UE) through an access point of a particular access area of the second communication network, the message comprising a second area identifier for identifying an access area last visited by the UE;
adding the first area identifier to the message;
forwarding the message comprising the first area identifier to the core network before coupling said UE to the core network through the second communication network; and
receiving a response to the message from the core network comprising the first area identifier.

11. The non-transitory computer readable medium of claim 10, wherein the set of first communication network access areas comprises the access areas in the plurality of first communication network access areas that neighbor the plurality of second communication network access areas.

12. The non-transitory computer readable medium of claim 10, wherein the computer program further comprises a set of instructions for transmitting the response comprising the first area identifier to the UE in the particular access area through the access point.

13. The non-transitory computer readable medium of claim 10, wherein the set of area identifiers that are associated with the first communication network access areas are detected by an access point associated with the particular second network access area and are sent to the network controller by the access point.

14. The non-transitory computer readable medium of claim 10, wherein the set of area identifiers are provided to the network controller by an external server based on an identifier of an access point associated with the particular access area.

15. The non-transitory computer readable medium of claim 10, wherein the set of instructions for determining the first area identifier for the second communication network comprises a set of instructions for mapping the set of area identifiers of the first communication network access areas to the first area identifier of the second communication network using a mapping table.

16. The non-transitory computer readable medium of claim 10, wherein the computer program further comprises a set of instructions for sending the determined first area identifier to an access point associated with the particular access area of the second communication network.

17. The non-transitory computer readable medium of claim 10, wherein an area identifier of the first communication network is one of a location area code (LAC) and a routing area code (RAC).

18. The non-transitory computer readable medium of claim 10, wherein an area identifier of the first communication network is one of a location area identifier (LAI) and a routing area identifier (RAI).

19. In a communication system comprising (i) a first communication network comprising a plurality of access areas and a core network and (ii) a second communication network comprising a plurality of access areas and a network controller for communicatively coupling the plurality of second communication network access areas to the core network, a non-transitory computer readable medium storing a computer program for execution by at least one processor of the network controller, the computer program comprising sets of instructions for:
receiving a message from a user equipment (UE) through an access point of a particular access area of the second communication network, the message comprising a first area identifier for identifying an access area of the communication system last visited by the UE;

adding a second area identifier to the message, wherein the second area identifier is for identifying the plurality of second communication network access areas as a single access area to the core network;

sending the message comprising the second area identifier to the core network before communicatively coupling said UE to the core network;

receiving a response to the message from the core network, the response comprising the second area identifier; and passing the response comprising the second area identifier to the access point of the particular access area, the access point communicatively coupling said UE to the network controller and replacing the second area identifier with a third area identifier identifying the particular access area of the access point before sending the response to the UE.

20. The non-transitory computer readable medium of claim 19, wherein the second area identifier is used by the core network to route messages to and from the network controller.

21. The non-transitory computer readable medium of claim 19, wherein the first area identifier identifies an access area of the first communication network last visited by the UE.

22. In a communication system comprising (i) a first communication network comprising a plurality of access areas and a core network and (ii) a second communication network comprising a plurality of access points for establishing a plurality of access areas of the second communication network and a network controller for communicatively coupling the plurality of access areas of the second communication network to the core network, a non-transitory computer readable medium storing a computer program for execution by at least one processor of a particular access point in the second communication network, the computer program comprising sets of instructions for:

receiving a message from a user equipment (UE) in a second communication network access area associated with the particular access point, the message comprising a first area identifier for identifying an access area of the first communication network;

adding a second area identifier to the message;

passing the message comprising the second area identifier to the network controller for sending to the core network through the network controller;

receiving a response to the message from the core network through the network controller, the response comprising the second area identifier;

replacing the second area identifier in the response with a third area identifier identifying the second communication network access area associated with the particular access point; and transmitting the response comprising the third area identifier to the UE.

23. The non-transitory computer readable medium of claim 22, wherein the first, second, and third area identifiers comprise location area codes (LACs) for location areas of a UMTS or GSM network, wherein the third area identifier is unique to area identifiers associated with other neighboring access areas of the communication system and is reusable to identify access areas that do not neighbor the access area associated with the particular access point.

24. The non-transitory computer readable medium of claim 22, wherein the response is sent from the network controller to the particular access point based on an international mobile subscriber identity (IMSI) associated with the UE.

25. The non-transitory computer readable medium of claim 22, wherein the second area identifier is for identifying the plurality of second communication network access areas as a single access area to the core network.

* * * * *